(12) United States Patent
Safont Sempere et al.

(10) Patent No.: US 12,261,284 B2
(45) Date of Patent: Mar. 25, 2025

(54) PROTECTIVE STRUCTURES FOR ELECTRODES

(71) Applicant: Sion Power Corporation, Tucson, AZ (US)

(72) Inventors: Marina M. Safont Sempere, Sahuarita, AZ (US); Chariclea Scordilis-Kelley, Tucson, AZ (US)

(73) Assignee: Sion Power Corporation, Tucson, AZ (US)

( * ) Notice: Subject to any disclaimer, the term of this patent is extended or adjusted under 35 U.S.C. 154(b) by 897 days.

(21) Appl. No.: 13/833,377

(22) Filed: Mar. 15, 2013

(65) Prior Publication Data

US 2014/0272594 A1    Sep. 18, 2014

(51) Int. Cl.
| | |
|---|---|
| H01M 4/1395 | (2010.01) |
| H01M 4/04 | (2006.01) |
| H01M 4/134 | (2010.01) |
| H01M 4/38 | (2006.01) |
| H01M 4/62 | (2006.01) |
| H01M 4/02 | (2006.01) |
| H01M 4/36 | (2006.01) |
| H01M 6/18 | (2006.01) |
| H01M 10/0525 | (2010.01) |

(52) U.S. Cl.
CPC ....... *H01M 4/1395* (2013.01); *H01M 4/0402* (2013.01); *H01M 4/134* (2013.01); *H01M 4/382* (2013.01); *H01M 4/62* (2013.01); *H01M 2004/021* (2013.01); *H01M 4/366* (2013.01); *H01M 6/187* (2013.01); *H01M 10/0525* (2013.01); *H01M 2300/0094* (2013.01); *Y02E 60/10* (2013.01)

(58) Field of Classification Search
None
See application file for complete search history.

(56) References Cited

U.S. PATENT DOCUMENTS

| | | | |
|---|---|---|---|
| 1,956,243 | A | 4/1934 | McEachron et al. |
| 3,716,409 | A | 2/1973 | Cairns et al. |
| 3,833,421 | A | 9/1974 | Rubischko et al. |
| 3,907,579 | A | 9/1975 | Ravault |

(Continued)

FOREIGN PATENT DOCUMENTS

| | | |
|---|---|---|
| CN | 1121264 A | 4/1996 |
| CN | 1430304 A | 7/2003 |

(Continued)

OTHER PUBLICATIONS

International Search Report and Written Opinion for PCT/US2013/031973 mailed Nov. 11, 2013.

(Continued)

*Primary Examiner* — Wyatt P McConnell
(74) *Attorney, Agent, or Firm* — Wolf, Greenfield & Sacks, P.C.

(57) ABSTRACT

A protective structure for use with metallic lithium (or other alkali or alkali earth metals) and its method of manufacture are provided. The protective structure may include a substantially continuous and substantially nonporous buffer layer disposed on the metallic lithium layer which is conductive to lithium ions. A substantially continuous and substantially nonporous protective layer may be disposed on the buffer layer.

29 Claims, 6 Drawing Sheets

(56) References Cited

U.S. PATENT DOCUMENTS

| | | |
|---|---|---|
| 3,951,689 A | 4/1976 | Ludwig |
| 4,011,374 A | 3/1977 | Kaun |
| 4,063,005 A | 12/1977 | Mamantov et al. |
| 4,169,120 A | 9/1979 | Miller |
| 4,184,013 A | 1/1980 | Weddigen et al. |
| 4,235,528 A | 11/1980 | Yano et al. |
| 4,339,325 A | 7/1982 | Solomon et al. |
| 4,410,609 A | 10/1983 | Peled et al. |
| 4,556,618 A | 12/1985 | Shia |
| 4,664,991 A | 3/1987 | Perichaud et al. |
| 4,677,415 A | 6/1987 | Howng |
| 4,683,178 A | 7/1987 | Stadnick et al. |
| 4,739,018 A | 4/1988 | Armand et al. |
| 4,770,956 A | 9/1988 | Knoedler |
| 4,833,048 A | 5/1989 | Dejonghe et al. |
| 4,917,974 A | 4/1990 | Dejonghe et al. |
| 4,954,371 A | 9/1990 | Yializis |
| 5,126,082 A | 6/1992 | Frank |
| 5,162,175 A | 11/1992 | Visco et al. |
| 5,194,341 A | 3/1993 | Bagley et al. |
| 5,314,765 A | 5/1994 | Bates et al. |
| 5,324,599 A | 6/1994 | Oyama et al. |
| 5,328,946 A | 7/1994 | Tuminello et al. |
| 5,366,829 A | 11/1994 | Saidi |
| 5,387,479 A | 2/1995 | Koksbang |
| 5,415,954 A | 5/1995 | Gauthier |
| 5,433,917 A | 7/1995 | Srivastava et al. |
| 5,434,021 A | 7/1995 | Fauteux et al. |
| 5,441,831 A | 8/1995 | Okamoto et al. |
| 5,460,905 A | 10/1995 | Skotheim |
| 5,462,566 A | 10/1995 | Skotheim |
| 5,487,959 A | 1/1996 | Koksbang |
| 5,516,598 A | 5/1996 | Visco et al. |
| 5,529,860 A | 6/1996 | Skotheim et al. |
| 5,538,812 A | 6/1996 | Lee et al. |
| 5,532,083 A | 7/1996 | McCullough |
| 5,569,520 A | 10/1996 | Bates |
| 5,582,623 A | 12/1996 | Chu |
| 5,601,947 A | 2/1997 | Skotheim et al. |
| 5,620,792 A | 4/1997 | Challener |
| 5,648,187 A | 7/1997 | Skotheim et al. |
| 5,681,615 A | 10/1997 | Affinito et al. |
| 5,686,201 A | 11/1997 | Chu |
| 5,690,702 A | 11/1997 | Skotheim et al. |
| 5,693,432 A | 12/1997 | Matsumoto |
| 5,698,339 A | 12/1997 | Kawakami et al. |
| 5,716,736 A | 2/1998 | Zhang et al. |
| 5,723,230 A | 3/1998 | Naoi et al. |
| 5,731,104 A | 3/1998 | Ventura et al. |
| 5,783,330 A | 6/1998 | Naoi et al. |
| 5,792,575 A | 8/1998 | Naoi et al. |
| 5,814,420 A | 9/1998 | Chu |
| 5,824,434 A | 10/1998 | Kawakami et al. |
| 5,834,137 A | 11/1998 | Zhang et al. |
| 5,882,819 A | 3/1999 | Naoi et al. |
| 5,895,732 A | 4/1999 | Clough |
| 5,919,587 A | 7/1999 | Mukherjee et al. |
| 5,961,672 A | 10/1999 | Skotheim et al. |
| 5,989,467 A | 11/1999 | Daws et al. |
| 6,025,094 A | 2/2000 | Visco et al. |
| 6,030,720 A | 2/2000 | Chu et al. |
| 6,066,417 A | 5/2000 | Cho et al. |
| 6,110,417 A | 8/2000 | Sugikawa |
| 6,110,621 A | 8/2000 | Sandi et al. |
| 6,117,590 A | 9/2000 | Skotheim et al. |
| 6,120,930 A | 9/2000 | Rouillard et al. |
| 6,143,216 A | 11/2000 | Loch et al. |
| 6,153,337 A | 11/2000 | Carlson et al. |
| 6,156,395 A | 12/2000 | Zhang et al. |
| 6,165,645 A | 12/2000 | Nishimura et al. |
| 6,168,694 B1 | 1/2001 | Huang et al. |
| 6,183,901 B1 | 2/2001 | Ying et al. |
| 6,201,100 B1 | 3/2001 | Gorkovenko et al. |
| 6,202,591 B1 | 3/2001 | Witzman et al. |
| 6,203,947 B1 | 3/2001 | Peled et al. |
| 6,225,002 B1 | 5/2001 | Nimon et al. |
| 6,268,695 B1 | 7/2001 | Affinito |
| 6,276,355 B1 | 8/2001 | Zhang et al. |
| 6,277,514 B1 | 8/2001 | Ying et al. |
| 6,284,412 B1 | 9/2001 | Minakata et al. |
| 6,306,545 B1 | 10/2001 | Carlson et al. |
| 6,328,770 B1 | 12/2001 | Gozdz |
| 6,358,643 B1 | 3/2002 | Katz et al. |
| 6,365,300 B1 * | 4/2002 | Ota ............... H01M 4/621 |
| | | 429/304 |
| 6,395,423 B1 | 5/2002 | Kawakami et al. |
| 6,402,795 B1 | 6/2002 | May-Ying et al. |
| 6,403,261 B2 | 6/2002 | Mitkin et al. |
| 6,413,645 B1 | 7/2002 | Graff et al. |
| 6,508,921 B1 | 1/2003 | Mu et al. |
| 6,517,968 B2 | 1/2003 | Johnson et al. |
| 6,528,211 B1 | 3/2003 | Nishimura et al. |
| 6,558,847 B1 | 5/2003 | Kawakami et al. |
| 6,570,325 B2 | 5/2003 | Graff et al. |
| 6,680,013 B1 | 1/2004 | Stein et al. |
| 6,723,140 B2 | 4/2004 | May-Ying et al. |
| 6,737,197 B2 | 5/2004 | Chu et al. |
| 6,753,036 B2 | 6/2004 | Jankowski et al. |
| 6,770,187 B1 | 8/2004 | Putter et al. |
| 6,797,428 B1 | 9/2004 | Skotheim et al. |
| 6,835,493 B2 | 12/2004 | Zhang et al. |
| 6,852,139 B2 | 2/2005 | Zhang et al. |
| 6,886,240 B2 | 5/2005 | Zhang et al. |
| 6,911,280 B1 | 6/2005 | De Jonghe et al. |
| 6,913,998 B2 | 7/2005 | Jankowski et al. |
| 7,019,494 B2 | 3/2006 | Mikhaylik |
| 7,029,796 B2 | 4/2006 | Choi et al. |
| 7,157,185 B2 | 1/2007 | Marple |
| 7,204,862 B1 | 4/2007 | Zhang et al. |
| 7,247,408 B2 | 7/2007 | Skotheim et al. |
| 7,250,233 B2 | 7/2007 | Choi et al. |
| 7,354,675 B2 | 4/2008 | Molter |
| 7,361,431 B2 | 4/2008 | Kim et al. |
| 7,553,584 B2 | 6/2009 | Chiang et al. |
| 7,579,112 B2 | 8/2009 | Chiang et al. |
| 7,771,870 B2 | 8/2010 | Affinito et al. |
| 7,785,730 B2 | 8/2010 | Affinito et al. |
| 8,076,024 B2 | 12/2011 | Affinito et al. |
| 8,087,309 B2 | 1/2012 | Kelley et al. |
| 8,105,717 B2 | 1/2012 | Skotheim et al. |
| 8,114,171 B2 | 2/2012 | Visco et al. |
| 8,182,943 B2 | 5/2012 | Visco et al. |
| 8,197,971 B2 | 6/2012 | Skotheim et al. |
| 8,202,649 B2 | 6/2012 | Visco et al. |
| 8,338,034 B2 | 12/2012 | Affinito et al. |
| 8,415,054 B2 | 4/2013 | Skotheim et al. |
| 8,603,680 B2 | 12/2013 | Affinito et al. |
| 8,617,748 B2 | 12/2013 | Mikhaylik et al. |
| 8,623,557 B2 | 1/2014 | Skotheim et al. |
| 8,728,661 B2 | 5/2014 | Skotheim et al. |
| 8,753,771 B2 | 6/2014 | Skotheim et al. |
| 8,871,387 B2 | 10/2014 | Wang et al. |
| 8,936,870 B2 | 1/2015 | Affinito et al. |
| 8,968,928 B2 | 3/2015 | Wang et al. |
| 9,005,311 B2 | 4/2015 | Safont-Sempere et al. |
| 9,040,197 B2 | 5/2015 | Affinito et al. |
| 9,040,201 B2 | 5/2015 | Affinito et al. |
| 9,065,149 B2 | 6/2015 | Skotheim et al. |
| 2001/0014420 A1 | 8/2001 | Takeuchi et al. |
| 2001/0024749 A1 | 9/2001 | Michot et al. |
| 2001/0034934 A1 | 11/2001 | Xu et al. |
| 2001/0041294 A1 | 11/2001 | Chu et al. |
| 2002/0012846 A1 | 1/2002 | Skotheim et al. |
| 2002/0018933 A1 | 2/2002 | Valentin et al. |
| 2002/0071989 A1 | 6/2002 | Verma |
| 2002/0119351 A1 | 8/2002 | Ovshinsky et al. |
| 2002/0192557 A1 | 12/2002 | Choi et al. |
| 2003/0073000 A1 | 4/2003 | Lee et al. |
| 2003/0082446 A1 | 5/2003 | Chiang et al. |
| 2003/0099884 A1 | 5/2003 | Chiang et al. |
| 2003/0108785 A1 | 6/2003 | Wu et al. |
| 2003/0113622 A1 | 6/2003 | Blasi et al. |
| 2003/0113624 A1 | 6/2003 | Kim et al. |
| 2003/0124416 A1 | 7/2003 | Kaneta |

(56) References Cited

U.S. PATENT DOCUMENTS

| | | |
|---|---|---|
| 2003/0180611 A1 | 9/2003 | Mikhaylik et al. |
| 2003/0222048 A1 | 12/2003 | Asakawa et al. |
| 2003/0224234 A1 | 12/2003 | Steele et al. |
| 2004/0037771 A1 | 2/2004 | Meissner et al. |
| 2004/0047798 A1 | 3/2004 | Oh et al. |
| 2004/0118698 A1 | 6/2004 | Lu et al. |
| 2004/0126653 A1* | 7/2004 | Visco .................. C03C 4/18 429/137 |
| 2004/0131944 A1 | 7/2004 | Visco et al. |
| 2004/0142244 A1 | 7/2004 | Visco et al. |
| 2004/0175621 A1 | 9/2004 | Iriyama et al. |
| 2004/0191607 A1 | 9/2004 | Tomoki et al. |
| 2004/0197641 A1 | 10/2004 | Visco et al. |
| 2004/0234851 A1 | 11/2004 | Kim et al. |
| 2005/0008938 A1* | 1/2005 | Cho .................. H01M 4/04 429/246 |
| 2005/0042515 A1 | 2/2005 | Hwang et al. |
| 2005/0048371 A1 | 3/2005 | Nagayama et al. |
| 2005/0051763 A1 | 3/2005 | Affinito et al. |
| 2005/0079420 A1* | 4/2005 | Cho .................. H01M 4/0402 429/231.95 |
| 2005/0100793 A1 | 5/2005 | Jonghe et al. |
| 2005/0130041 A1 | 6/2005 | Fensore, III |
| 2005/0147886 A1 | 7/2005 | Mikhaylik |
| 2005/0156575 A1 | 7/2005 | Mikhaylik |
| 2005/0158535 A1 | 7/2005 | Zhang et al. |
| 2005/0175904 A1 | 8/2005 | Gorkovenko |
| 2005/0186469 A1 | 8/2005 | De Jonghe et al. |
| 2005/0208353 A1 | 9/2005 | Johnson |
| 2005/0234177 A1 | 10/2005 | Zaghib et al. |
| 2005/0266990 A1 | 12/2005 | Iwasaki et al. |
| 2006/0024579 A1 | 2/2006 | Kolosnitsyn et al. |
| 2006/0194096 A1 | 8/2006 | Valle et al. |
| 2006/0222954 A1 | 10/2006 | Skotheim et al. |
| 2006/0238203 A1 | 10/2006 | Kelley et al. |
| 2007/0065701 A1 | 3/2007 | Cable et al. |
| 2007/0117007 A1 | 5/2007 | Visco et al. |
| 2007/0172739 A1 | 7/2007 | Visco |
| 2007/0207370 A1 | 9/2007 | Kwak et al. |
| 2007/0212583 A1 | 9/2007 | Johnson |
| 2007/0221265 A1 | 9/2007 | Affinito et al. |
| 2007/0224502 A1 | 9/2007 | Affinito et al. |
| 2008/0014501 A1 | 1/2008 | Skotheim et al. |
| 2008/0057397 A1 | 3/2008 | Skotheim et al. |
| 2008/0070087 A1 | 3/2008 | Johnson |
| 2008/0100264 A1 | 5/2008 | Kolosnitsyn et al. |
| 2008/0187663 A1 | 8/2008 | Affinito |
| 2008/0213672 A1 | 9/2008 | Skotheim et al. |
| 2008/0246580 A1 | 10/2008 | Braun et al. |
| 2008/0318128 A1 | 12/2008 | Simoneau et al. |
| 2009/0053607 A1 | 2/2009 | Jeong et al. |
| 2009/0098457 A1 | 4/2009 | Kwon et al. |
| 2009/0159853 A1 | 6/2009 | Sengupta et al. |
| 2009/0200986 A1 | 8/2009 | Kopera et al. |
| 2009/0291353 A1 | 11/2009 | Affinito et al. |
| 2009/0311604 A1 | 12/2009 | Nazar et al. |
| 2010/0035128 A1 | 2/2010 | Scordilis-Kelley et al. |
| 2010/0068623 A1 | 3/2010 | Braun et al. |
| 2010/0068628 A1 | 3/2010 | Ueda |
| 2010/0104948 A1 | 4/2010 | Skotheim et al. |
| 2010/0129699 A1 | 5/2010 | Mikhaylik et al. |
| 2010/0143823 A1 | 6/2010 | Tanaka et al. |
| 2010/0239914 A1 | 9/2010 | Mikhaylik et al. |
| 2010/0285360 A1 | 11/2010 | Kozinsky et al. |
| 2010/0285372 A1* | 11/2010 | Lee .................. H01M 6/185 429/320 |
| 2010/0291442 A1 | 11/2010 | Wang et al. |
| 2010/0327811 A1 | 12/2010 | Affinito et al. |
| 2011/0008531 A1 | 1/2011 | Mikhaylik et al. |
| 2011/0014524 A1 | 1/2011 | Skotheim et al. |
| 2011/0045346 A1 | 2/2011 | Chiang et al. |
| 2011/0059361 A1 | 3/2011 | Wilkening et al. |
| 2011/0068001 A1 | 3/2011 | Affinito et al. |
| 2011/0070491 A1 | 3/2011 | Campbell et al. |
| 2011/0070494 A1 | 3/2011 | Campbell et al. |
| 2011/0076560 A1 | 3/2011 | Scordilis-Kelley et al. |
| 2011/0159376 A1 | 6/2011 | Skotheim et al. |
| 2011/0177398 A1 | 7/2011 | Affinito et al. |
| 2011/0200868 A1 | 8/2011 | Klaassen |
| 2011/0206992 A1 | 8/2011 | Campbell et al. |
| 2011/0256450 A1 | 10/2011 | Campbell et al. |
| 2012/0043940 A1 | 2/2012 | Affinito et al. |
| 2012/0048729 A1 | 3/2012 | Mikhaylik et al. |
| 2012/0052397 A1 | 3/2012 | Mikhaylik et al. |
| 2012/0070746 A1 | 3/2012 | Mikhaylik et al. |
| 2012/0082872 A1 | 4/2012 | Schmidt et al. |
| 2012/0141881 A1 | 6/2012 | Geier et al. |
| 2012/0276449 A1 | 11/2012 | Skotheim et al. |
| 2013/0017441 A1 | 1/2013 | Affinito et al. |
| 2013/0095380 A1 | 4/2013 | Affinito et al. |
| 2013/0143096 A1 | 6/2013 | Affinito et al. |
| 2013/0216915 A1 | 8/2013 | Affinito et al. |
| 2013/0280605 A1 | 10/2013 | Affinito et al. |
| 2014/0045075 A1 | 2/2014 | Skotheim et al. |
| 2014/0062411 A1 | 3/2014 | Mikhaylik et al. |
| 2014/0072873 A1 | 3/2014 | Wang et al. |
| 2014/0079994 A1 | 3/2014 | Affinito et al. |
| 2014/0123477 A1 | 5/2014 | Safont-Sempere et al. |
| 2014/0127419 A1 | 5/2014 | Fleischmann et al. |
| 2014/0127577 A1 | 5/2014 | Fleischmann et al. |
| 2014/0205912 A1 | 7/2014 | Skotheim et al. |
| 2014/0272565 A1 | 9/2014 | Gronwald et al. |
| 2015/0010804 A1 | 1/2015 | Laramie et al. |
| 2015/0044517 A1 | 2/2015 | Mikhaylik et al. |
| 2015/0086837 A1 | 3/2015 | Laramie et al. |
| 2015/0162586 A1 | 6/2015 | Fleischmann et al. |
| 2015/0180037 A1 | 6/2015 | Gronwald et al. |
| 2015/0236320 A1 | 8/2015 | Laramie et al. |
| 2015/0236322 A1 | 8/2015 | Laramie et al. |
| 2015/0280277 A1 | 10/2015 | Fleischmann et al. |
| 2015/0287986 A1 | 10/2015 | Affinito et al. |
| 2015/0318552 A1 | 11/2015 | Skotheim et al. |
| 2015/0349310 A1 | 12/2015 | Viner et al. |

FOREIGN PATENT DOCUMENTS

| | | |
|---|---|---|
| CN | 1534811 A | 10/2004 |
| CN | 1574427 | 2/2005 |
| CN | 1874027 A | 12/2006 |
| CN | 101026247 | 8/2007 |
| DE | 101 28 970 A1 | 12/2002 |
| EP | 0 700 109 A1 | 3/1996 |
| EP | 1 717 879 A1 | 11/2006 |
| EP | 13878287.5 | 8/2016 |
| GB | 1011353 A | 11/1965 |
| GB | 1 396 062 A | 5/1975 |
| JP | 63-126156 | 5/1988 |
| JP | 4-028172 | 1/1992 |
| JP | 05-325978 A | 12/1993 |
| JP | 6-030246 | 4/1994 |
| JP | 09-147868 A | 6/1997 |
| JP | 09-279357 A | 10/1997 |
| JP | 11-176423 A | 7/1999 |
| JP | 2001-093577 | 4/2001 |
| JP | 2001-143757 | 5/2001 |
| JP | 2003-193110 A | 7/2003 |
| JP | 2003-303588 A | 10/2003 |
| JP | 2004-165097 A | 6/2004 |
| JP | 2004-247317 A | 9/2004 |
| JP | 2005-251429 A | 9/2005 |
| JP | 2005-310836 A | 11/2005 |
| JP | 2006-143478 A | 6/2006 |
| JP | 2007-234338 A | 9/2007 |
| JP | 2009-076260 A | 4/2009 |
| JP | 2010-009856 A | 1/2010 |
| JP | 2010-055755 A | 3/2010 |
| KR | 10-0436712 B1 | 6/2004 |
| KR | 10-0484642 B1 | 4/2005 |
| WO | WO 1997/001870 A1 | 1/1997 |
| WO | WO 1997/044840 A1 | 11/1997 |
| WO | WO 1999/019931 A1 | 4/1999 |
| WO | WO 1999/033125 A1 | 7/1999 |
| WO | WO 1999/033130 A1 | 7/1999 |
| WO | WO 1999/057770 A1 | 11/1999 |

(56) References Cited

FOREIGN PATENT DOCUMENTS

| | | |
|---|---|---|
| WO | WO 2001/033651 A1 | 5/2001 |
| WO | WO 2001/039302 A1 | 5/2001 |
| WO | WO 2001/039303 A1 | 5/2001 |
| WO | WO 2001/097304 A1 | 12/2001 |
| WO | WO 2002/071989 A1 | 9/2002 |
| WO | WO 2005/038953 A1 | 4/2005 |
| WO | WO 2007/028972 A1 | 3/2007 |
| WO | WO 2007/097172 A1 | 8/2007 |
| WO | WO 2008/153749 A1 | 12/2008 |
| WO | WO 2009/017726 A1 | 2/2009 |
| WO | WO 2009/042071 A2 | 4/2009 |
| WO | WO 2009/054987 A1 | 4/2009 |
| WO | WO 2009/089018 A2 | 7/2009 |
| WO | WO 2009/114314 A2 | 9/2009 |
| WO | WO 2010/062391 A2 | 6/2010 |
| WO | WO 2010/074690 A1 | 7/2010 |
| WO | WO 2012/027457 A2 | 3/2012 |
| WO | PCT/US2013/031973 | 9/2015 |

OTHER PUBLICATIONS

Affinito et al., "A New Class of Ultra-Barrier Materials," 47th Annual Technical Conference Proceedings (2004) ISSN 0737-5921.
Affinito et al., "High Rate Process for Deposition of Plasma Polymerized Films from High Molecular Weight/Low Vapor Pressure Liquid or Solid Monomer Precursor," 2nd International Symposium on Plasma Polymerization/Deposition: Fundamental and Applied Aspects (1999).
Affinito et al., "High rate vacuum deposition of polymer electrolytes," J. Vac. Sci. Technol., A 14(3):733-8 (1996).
Alamgir et al., "Room Temperature Polymer Electrolytes," Lithium Batteries, New Materials, Developments and Perspectives, Chapter 3, pp. 93-136, Elsevier, Amsterdam (1994).
Brunauer et al., Adsorption of Gases in Multimolecular Layers. J Am Chem Soc. 1938;60(2):309-19.
Campbell et al., Electrodeposition of Mesoporous Nickel onto Foamed Metals Using Surfactant and Polymer Templates. J Porous Mater. 2004;11(2):63-69.
Cheon et al., Capacity fading mechanisms on cycling a high-capacity secondary sulfur cathode. J Electrochem Soc. Oct. 29, 2004;151(12):A2067-73.
Cheon et al., Rechargeable lithium sulfur battery: II. Rate capability and cycle characteristics. J Electrochem Soc. May 5, 2003;150(6):A800-05.
Cunningham et al., Phase Equilibria in Lithium-Chalcogen Systems. J Electrochem Soc. 1972;119:1448-50.
Doherty et al., Colloidal Crystal Templating to Produce Hierarchically Porous LiFePO4 Electrode Materials for High Power Lithium Ion Batteries. Chem Mater. 2009;21(13):2895-2903.
Dominey, "Current State of the Art on Lithium Battery Electrolytes," Lithium Batteries, New Materials, Developments and Perspectives, Chapter 4, pp. 137-165, Elsevier, Amsterdam (1994).
Garboczi, Permeability, diffusivity, and microstructural parameters: A critical review. Cement and Concrete Res. Jul. 1990;20(4):591-601.
Gireaud et al., Lithium metal stripping/plating mechanism studies: A metallurgical approach. Electrochemistry Communications. 2006;8:1639-49.
Gonzenbach et al., Macroporous ceramics from particle-stabilized wet foams. J Am Ceram Soc. 2007;90(1):16-22.
Hassoun et al., A High-Performance Polymer Tin Sulfur Lithium Ion Battery. Angew. Chem. Int. Ed. 2010, 49, 2371-2374.
Hayashi et al., All-solid-state rechargeable lithium batteries with Li2S as a positive electrode material. Journal of Power Sources 183 (2008) 422-426.
Hirai et al., Influence of electrolyte on lithium cycling efficiency with pressurized electrode stack. J. Electrochem. Soc. 1994;141:611-14.
Ji et al., A highly ordered nanostructured carbon-sulphur cathode for lithium-sulphur batteries. Nature Mater. May 1, 20097;8(6):500-06.

Kim et al., Correlation between positive-electrode morphology and sulfur utilization in lithium-sulfur battery. J Power Sources. May 20, 2004;132(1-2):209-12.
Kulinowski et al., Porous metals from colloidal templates. Adv Mater. 2000;12(11): 833-38.
Lai et al., Synthesis and Electrochemical Performance of Sulfur/Highly Porous Carbon Composites. J. Phys. Chem. C 2009, 113, 4712-4716.
Mikhaylik et al., 380 Wh/kg Rechargeable Li/S Batteries Operating at 90% of Sulfur Utilization. 206th Meeting of The Electrochemical Society. Honolulu, Hawaii. Oct. 3-8, 2004. Abst. 443.
Mikhaylik et al., Polysulfide Shuttle Study in the Li/S Battery System. J Electrochem Soc. 2004;151:A1969-76.
Peer, Tef_methy_ethyl. Accessed online at peer.tamu.edu/curriculum_modules/properties/module_3/Tef_methyl_ethyl.htm. Last accessed May 31, 2013. 1 page.
Probst et al., Structure and electrical properties of carbon black. Carbon. Feb. 2002;40(2):201-5.
Rauh et al., A Lithium/Dissolved Sulfur Battery with an Organic Electrolyte. J Electrochem Soc. 1979;126:523-27.
Ravikrishna et al., Low-temperature synthesis of porous hydroxyapatite scaffolds using polyaphron templates. J Sol-Gel Sci Techn. Apr. 2006;38(2):203-10.
Ronci et al., A novel approach to in situ diffractometry of intercalation materials: the EDXD technique. Preliminary results on LiNi0.8Co0.2O2. Electrochem Solid-State Lett. 2000;3(4):174-7.
Ruiz-Morales et al., Microstructural optimisation of materials for SOFC applications using PMMA microspheres. J Mater Chem. 2006;16:540-42.
Ryu et al., Discharge behavior of lithium/sulfur cell with TEGDME based electrolyte at low temperature. J Electrochem Soc. 2006;163:201-06.
Sakka et al., Fabrication of porous ceramics with controlled pore size by colloidal processing. Sci Technol Adv Mater. Nov. 2005;6(8):915-20.
Schultz, Lithium: measurement of Young's modulus. Fermilab Technical Memo 2191. Oct. 2002. 6 pages.
Shim et al., The Lithium/Sulfur Rechargeable Cell. Effects of Electrode Composition and Solvent on Cell Performance. J Electrochem Soc. 2002; 149:A1321-25.
Shin et al., Characterization of N-Methyl-N-Butylprrolidinium Bis(trifluoromethanesulfonyl)imide-LiTFSI-Tetra(ethylene gylcol) Dimethyl Ether Mixtures as a Li Metal Cell Electrolyte. J Power Sources. 2008;155:A368-73.
Storck, S. et al., "Characterization of micro- and mesoporous solids by physisorption methods and pore-size analysis", *Applied Catalysis A: General*, 174 (1998) 137-146.
Takeuchi et al., Preparation of electrochemically active lithium sulfide-carbon composites using spark-plasma-sintering process. Journal of Power Sources 195 (2010) 2928-2934.
Wang et al., Electrochemical characteristics of sulfur composite cathode materials in rechargeable lithium batteries. J Power Sources. Nov. 15, 2004;138(1-2):271-73.
Wang et al., Polymer lithium cells with sulfur composites as cathode materials. Electrochimica Acta 48 (2003) 1861-1867.
Wang et al., Sulfur-carbon nano-composite as cathode for rechargeable lithium battery based on gel electrolyte. Electrochem Comm. 2002;4(6):499-502.
Woo et al., Preparation and characterization of three demensionally ordered macroporous Li4Ti5O12 anode for lithium batteries. Electrochimica Acta. 2007;53(1):79-82.
Yuan et al., Improvement of cycle property of sulfur-coated multi-walled carbon nanotubes composite cathode for lithium/sulfur batteries. J Power Sources. Apr. 15, 2009;189(2):1141-46.
Zhang et al., Dual-scale porous electrodes for solid oxide fuel cells from polymer foams. Adv Mater. 2005;17(4):487-91.
Zhang et al., Enhancement of long stability of sulfur cathode by encapsulating sulfur into micropores of carbon spheres. Energy & Environmental Science. 2010, 3, 1531-1537.
Zhang et al., Novel Nanosized Adsorbing Composite Cathode Materials for the Next Generational Lithium Battery. Journal of Wuhan University of Technology—Mater. Sci. Ed. 2007;22(2):234-39.

(56) References Cited

OTHER PUBLICATIONS

Zhang et al., Three-dimensional ordered macroporous platinum-based electrode for methanol oxidation. Chinese Sci Bulletin. Jan. 2006;51(1):19-24.

Zhao et al., "A solid-state electrolyte lithium phosphorous oxynitride film prepared by pulsed laster deposition," Thin Solid Films, vol. 415, Issues 1-2, pp. 108-113 (Aug. 1, 2002).

Zheng et al., Electrochemical properties of rechargeable lithium batteries with sulfur-containing composite cathode materials. Electrochem Solid-State Lett., May 12, 2006; 9(7):A364-A367.

Zheng et al., Novel nanosized adsorbing sulfur composite cathode materials for the advanced secondary lithium batteries. Electrochimica Acta. Jan. 5, 2006;51(7):1330-35.

Zhuang et al., "The Reaction of lithium with carbon dioxide studied by photoelectron spectroscopy," Surface Science, 418, pp. 139-149 (1998).

International Preliminary Report on Patentability for PCT/US2013/031973 mailed Sep. 15, 2015.

Extended European Search Report for EP 13878287.5 mailed Aug. 16, 2016.

U.S. Appl. No. 12/312,764, filed Feb. 2, 2010, Mikhaylik et al.
U.S. Appl. No. 14/078,648, filed Nov. 13, 2013, Mikhaylik et al.
U.S. Appl. No. 12/535,328, filed Aug. 4, 2009, Scordilis-Kelley et al.
U.S. Appl. No. 12/727,862, filed Mar. 19, 2010, Mikhaylik et al.
U.S. Appl. No. 12/862,528, filed Aug. 24, 2010, Affinito et al.
U.S. Appl. No. 13/524,662, filed Jun. 15, 2012, Affinito et al.
U.S. Appl. No. 13/644,933, filed Oct. 4, 2012, Affinito et al.
U.S. Appl. No. 13/850,437, filed Mar. 26, 2013, Affinito et al.
PCT/US2013/031973, Nov. 11, 2013, International Search Report and Written Opinion.

\* cited by examiner

PROTECTIVE STRUCTURES FOR ELECTRODES

STATEMENT REGARDING FEDERALLY SPONSORED RESEARCH

This invention was made with government support under Grant No. DE-AR0000067 awarded by the Department of Energy ARPA-E program (ARPA-E BEEST DE-FOA-00000207-1536). The government has certain rights in the invention.

FIELD OF THE INVENTION

Disclosed embodiments are related to protective structures for electrodes.

BACKGROUND

One of the factors that decreases cycle life in lithium- (or other alkali metal- or alkali earth metal-) based batteries is the consumption of electrolyte during cycling of the battery due to reaction of metallic lithium present in the electrodes with the electrolyte. In order to minimize, or substantially prevent, this reaction and consequently increase the cycle life of the cell, it is desirable to isolate the metallic lithium from the electrolyte. This often times involves the use of a lithium ion conductive material coated on the surface of the metallic lithium. This material allows lithium ions to diffuse to and from the metallic lithium surface while excluding the electrolyte to substantially prevent this reaction. Improvements in the protective structures for lithium and other alkali metal electrodes would be beneficial and would have application in a number of different fields involving the use of such batteries and electrodes.

SUMMARY

Disclosed embodiments are related to protective structures for electrodes. The subject matter of this application involves, in some cases, interrelated structures and methods, alternative solutions to a particular problem, and/or a plurality of different uses of structures.

In one embodiment, an electrode structure may include a metallic lithium layer and a substantially continuous and substantially nonporous buffer layer disposed on the metallic lithium layer. The buffer layer may be conductive to lithium ions. Further, a substantially continuous and substantially nonporous lithium nitride layer may be disposed on the buffer layer.

In another embodiment, an electrode structure may include an electroactive material layer comprising an electroactive species and a substantially continuous and substantially nonporous buffer layer disposed on the electroactive material layer. The buffer layer may be conductive to the electroactive species. A substantially continuous and substantially nonporous protective layer may also be disposed on the buffer layer. The protective layer may be formed using a gas, a plasma, a material, or a fluid that is reactive with the electroactive material layer.

In yet another embodiment, a method for forming an electrode structure is provided. The method may include providing a metallic lithium layer, depositing a substantially continuous and substantially nonporous buffer layer onto the metallic lithium layer, wherein the buffer layer may be conductive to lithium ions, and depositing a substantially continuous and substantially nonporous lithium nitride layer onto the buffer layer.

In another embodiment, a method for forming an electrode structure may include providing an electroactive material layer comprising an electroactive species, depositing a substantially continuous and substantially nonporous buffer layer on the electroactive material layer, wherein the buffer layer may be conductive to the electroactive species, and depositing a substantially continuous and substantially nonporous protective layer onto the buffer layer using a gas, a plasma, a material, or a fluid that is reactive with the electroactive material layer.

It should be appreciated that the foregoing concepts, and additional concepts discussed below, may be arranged or combined in any suitable configuration, as the present disclosure is not limited in this respect.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1:
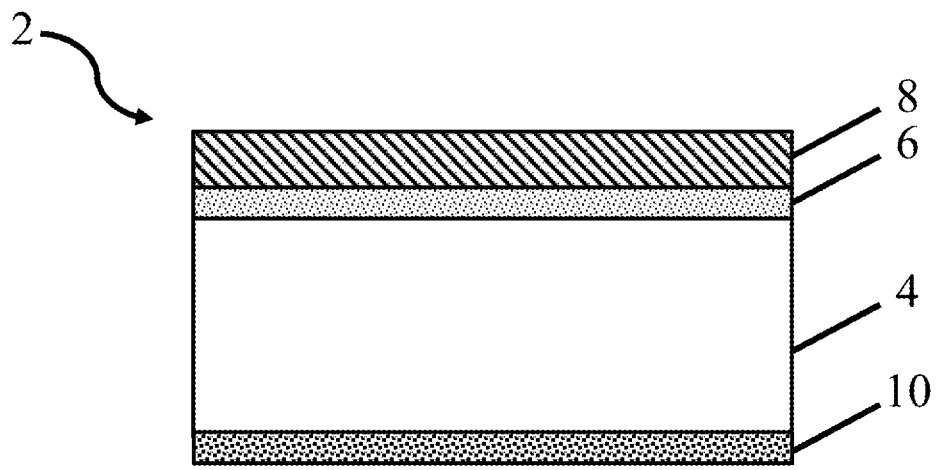
FIG. 1 is a schematic representation of an electrode structure incorporating a protective layer deposited on a buffer layer according to one set of embodiments.

Protective structures for electrodes, such as lithium metal electrodes, are provided. While any number of materials might be suitable for use in a protective structure, one suitable material for use as a protective structure in an electrode structure is lithium nitride due to its high lithium ion conductivity. A lithium nitride layer may be produced by reaction of lithium with nitrogen gas and coated onto an inert substrate (i.e., a substrate that does not include lithium) such as a polyester (e.g., polyethylene terephthalate) or polyimide substrate, a metallized substrate, or a bare substrate. When manufactured in this fashion, the lithium nitride layer may be uniform and continuous as well as being substantially amorphous and non-porous. The lithium nitride layer can then be laminated or otherwise disposed onto lithium metal to form a protected electrode structure.

While the above process may produce a useable protective layer, the inventors have recognized that it is desirable to form the protective layer directly onto metallic lithium. Forming a lithium nitride layer directly onto metallic lithium can afford several advantages such as simplifying the manufacturing process (as a separate lamination step would not be required), reducing the number of interfaces, reducing the thickness of the protective layer, and/or providing an improved interface between the metallic lithium and the lithium nitride which may result in lower interface resistance and lower overall cell resistance. However, when some protective layers such as lithium nitride are coated on top of a metallic lithium surface, partial or total conversion of the underlying metallic lithium may occur due to reaction of the lithium metal with the reactive gas used to form the protective layer (e.g., nitrogen gas). In other words, instead of simply forming a layer of lithium nitride on the metallic lithium, all or a portion of the bulk metallic lithium may also react with the nitrogen to form lithium nitride. This reaction with the underlying bulk metallic lithium results in a polycrystalline, porous ceramic layer which may be unsuitable as a protective layer since electrolyte can diffuse through the porous structure and react with the underlying metallic lithium. Moreover, since the conversion of the lithium surface may proceed in a non-uniform fashion, the thickness of the resulting ceramic layer of lithium nitride may not be substantially uniform across the metallic lithium surface.

In view of the above, the inventors have recognized that it is desirable to substantially prevent conversion of the underlying metallic lithium during the deposition of lithium nitride, or any other appropriate protective layer, to provide a substantially continuous protective layer with a reduced porosity. As described in more detail below, one way in which to avoid conversion of the underlying metallic lithium is to provide a lithium ion conductive material between the underlying metallic lithium prior and the protective layer.

The lithium ion conductive material may act as a buffer between the underlying metallic lithium and the subsequently deposited protective layer. In order to reduce or prevent non-desired reactions, this buffer layer may comprise a material that is substantially compatible with either one or both of the underlying metallic lithium and the protective layer. The buffer layer may also be substantially continuous and/or nonporous to effectively isolate the metallic lithium from the protective layer.

Without wishing to be bound by theory, substantially avoiding the interconversion of the surface of the underlying metallic lithium during deposition of a lithium nitride protective layer may result in a substantially continuous, less-porous, more amorphous, and smoother lithium nitride layer protective layer being deposited. Further, as described in more detail below, the lithium nitride coating thickness may be more precisely controlled due to substantially eliminating the uncontrolled and substantially non-uniform growth associated with interconversion of the underlying metallic lithium. When compared to the polycrystalline porous structure resulting from direct deposition of the lithium nitride protective layer onto the underlying metallic lithium without a buffer layer, the resulting protective structure formed by using a buffer layer is expected to substantially prevent reaction between the electrolyte and metallic lithium, resulting in an increased cycle life. Further, since the thickness of the lithium nitride protective layer is more controllable when substantially avoiding interconversion, a specific and substantially uniform protective layer thickness may be provided.

For the sake of clarity, the structures described herein are referred to as electrode structures, which may refer to either an electrode precursor or a final electrode. An electrode precursor may include, for example, an electrode including one or more components such as a carrier substrate that will not be present in a final electrode or final electrochemical cell, or an electrode that is absent one or more components prior to being used as a final electrode or in a final electrochemical cell. It should be understood, therefore, that the embodiments described herein should not be limited to either an electrode precursor or a final electrode. Instead, the embodiments described herein are meant to apply to any of an electrode precursor, an unassembled final electrode, and a final electrode assembled into an electrochemical cell or any other appropriate device.

While the electrode structures described herein are described in reference to a lithium metal-based system, it should be understood that the methods and articles described herein may be applicable to any suitable electrochemical system in which the underlying electroactive material is reactive with a subsequently deposited protective layer. Such systems may include, for example, other alkali metal or alkali earth metal systems (e.g., alkali metal anodes including lithium-ion anodes), or even non-alkali metal systems. Additionally, although rechargeable electrochemical cells are intended to benefit from the current disclosure, non-rechargeable (i.e., primary) electrochemical cells can also benefit from the current disclosure.

Turning now to the figures, specific embodiments of the current electrode structures are described in more detail below. It should be understood that while certain layers depicted in the figures are disposed directly on one another, other intermediate layers may also be present between the depicted layers in certain embodiments. Accordingly, as used herein, when a layer is referred to as being "disposed on", "deposited on", or "on" another layer, it can either be directly disposed on, deposited onto, or on the layer, or an intervening layer may also be present. In contrast, a layer that is "directly disposed on", "in contact with", "directly deposited on", or "directly on" another layer indicates that no intervening layer is present.

FIG. 1 depicts one embodiment of an electrode structure 2. The electrode structure includes an electroactive material layer 4, a buffer layer 6 disposed on the metallic lithium layer 4, and a protective layer 8 disposed on the buffer layer 6. As described above, buffer layer 6 and protective layer 8 may be substantially continuous and nonporous to both protect the underlying electroactive material layer from reacting with the electrolyte present in an electrochemical cell, as well as substantially prevent reaction between the underlying electroactive material layer and the protective layer.

The electroactive material layer 4 may be made from any appropriate material used for a desired application. Therefore, while many of the embodiments described herein refer to metallic lithium as the electroactive material, other electroactive materials are also possible. In some embodiments, the electroactive material is a metal alloy, such as lithium metal doped with Al, Ag, Mg, Zn, or Si. Examples of other applicable alloys are described in more detail in U.S. patent application Ser. No. 12/862,528, filed on Aug. 24, 2010, published as U.S. Pub. No. 2011/0177398, entitled "Electrochemical Cell" and U.S. patent application Ser. No. 11/821,576, filed on Jun. 22, 2007, published as U.S. Pub. No. 2008/0318128, entitled "Lithium Alloy/Sulfur Batteries", which are incorporated herein by reference in their entirety for all purposes. In other embodiments, suitable electroactive materials include other alkali or earth alkali metal/alloy based materials.

In some embodiments, the electroactive material layer functions as both the electroactive material and as a current collector. Alternatively, in some embodiments, such as an electrode structure for a high rate electrochemical cell, it is desirable to include a current collector 10, see FIG. 1. In such an embodiment, the current collector may function to collect charge from the electroactive material and conduct that charge to a lead and external contact. In some embodiments, the current collector may also function as a structural element for deposition of the electroactive material and/or supporting the electrode structure.

As noted above, buffer layer 6 may substantially isolate the electroactive material layer 4 from the protective layer 8 to substantially prevent conversion of the electroactive material layer during deposition of the protective layer as well as any subsequent reactions. Without wishing to be bound by theory, a buffer layer that is porous and/or not continuous will not effectively isolate the electroactive material layer from reactive gases, materials, or fluids used to form the protective layer due to diffusion of those reactive gases, materials, or fluids through the porous buffer layer. In order to isolate the electroactive material layer, in some embodiments it is desirable that the buffer layer 6 be substantially continuous, nonporous, and defect free across substantially the entire surface of the electroactive material layer. In some embodiments, it is also desirable that the buffer layer be substantially compatible with one, or both, of the electroactive material layer and protective layer to avoid reactions of the buffer layer with the electroactive material layer and protective layer. Further, due to the buffer layer being disposed on the electroactive material layer, it is desirable that the buffer layer be conductive to the electroactive species of the electroactive material layer.

In some cases, at least a portion of the buffer layer is not substantially nonporous or continuous, but any pores, defects, or non-continuous portions may be filled with a material that allows the buffer layer to have an overall substantially nonporous and substantially continuous configuration. For example, in some embodiments the deposition of an intermediate layer over the buffer layer may result in some of the material from the intermediate layer filling any pores, defects, and/or non-continuous portions of the buffer layer. The material filling the pores, defects, and/or non-continuous portions of the buffer layer may be, for example, a ceramic, a glassy-ceramic, a glass, or a polymer. In other embodiments, at least a portion of the buffer layer is not substantially nonporous or continuous, but covers enough of the electroactive material layer to substantially prevent or reduce conversion of the electroactive material during subsequent deposition of a protective layer. Other configurations of the buffer layer are also possible.

As discussed in more detail in Example 4 below, direct conversion of the electroactive material surface to form a buffer layer does not result in a substantially nonporous and continuous buffer layer. Without wishing to be bound by theory, directly converting the material located on the electroactive material surface from, for example, metallic lithium to lithium oxide results in a large volume increase. As the conversion process continues, delamination and fracturing of the converted material relative to the underlying electroactive material may occur to accommodate the associated volume change and resulting in the observed porous buffer layer. One specific example of direct conversion of the electroactive material surface is a plasma treatment of an electroactive material such as metallic lithium to form, for example, lithium oxide or another material. As presented in the examples, the resulting lithium oxide layer is porous and does not isolate the underlying metallic lithium during subsequent deposition of the protective layer resulting in partial or total conversion of the metallic lithium. In view of the above, in at least some embodiments, a buffer layer is deposited onto the electroactive material layer instead of directly converting a surface of the electroactive material to form the buffer layer. However, when combined with other intermediate layers to effectively isolate the electroactive material during deposition of the protective layer, direct conversion of the electroactive material may be performed in some embodiments.

The buffer layer may be made from any suitable material. Depending on the particular embodiment, the buffer layer may be either electrically insulating or electrically conducting. In some embodiments, the buffer layer is a ceramic, a glassy-ceramic, or a glass. With respect to the current discussion regarding lithium metal based electrode structures, suitable materials for the protective layer may include, but are not limited to, lithium oxides (e.g., $Li_2$-O, LiO, $LiO_2$, $LiRO_2$, where R is a rare earth metal), lithium phosphorus oxynitride, lithium oxynitride, lithium carbonate, lithium halide, lithium iodide, and lithium bromide. Various other lithium conductive ceramic materials that are nonreactive with metallic lithium could also be used for the buffer layer as the current disclosure is not limited in this fashion. In some embodiments, the buffer layer may be formed from more than one material or material layers.

In some embodiments, the buffer layer may exhibit ion conductivities relative to the electroactive species greater than or equal to about $10^{-7}$ S/cm, greater than or equal to about $10^{-6}$ S/cm, greater than or equal to about $10^{-5}$ S/cm, greater than or equal to about $10^{-4}$ S/cm, greater than or equal to about $10^{-3}$ S/cm, or any other appropriate conductivity. Correspondingly, the buffer layer may exhibit conductivities of less than or equal to about $10^{-1}$ S/cm, less than or equal to about $10^{-2}$ S/cm, less than or equal to about $10^{-3}$ S/cm, less than or equal to about $10^{-4}$ S/cm, or any other appropriate conductivity. Combinations of the above are possible (e.g., a conductivity of greater than or equal to about $10^{-7}$ S/cm and less than or equal to about $10^{-4}$ S/cm). Other ranges are also possible.

In certain embodiments, the thickness of the electroactive material layer may vary from, e.g., about 2 to 200 microns. For instance, the electroactive material layer may have a thickness of less than or equal to about 200 microns, less than or equal to about 100 microns, less than or equal to about 75 microns, less than or equal to about 50 microns, less than or equal to about 25 microns, less than or equal to about 20 microns, less than or equal to about 15 microns, less than or equal to about 10 microns, less than or equal to about 5 microns, or any other appropriate thickness. In some embodiments, the electroactive material layer may have a thickness of greater than or equal to about 1 micron, greater than or equal to about 2 microns, greater than or equal to about 3 microns, greater than or equal to about 4 microns, greater than or equal to about 5 microns, greater than or equal to about 10 microns, greater than or equal to about 15 microns, greater than or equal to about 20 microns, greater than or equal to about 50 microns, greater than or equal to about 75 microns, greater than or equal to about 100 microns, greater than or equal to about 150 microns, or any other appropriate thickness. Combinations of the above-referenced ranges are also possible (e.g., greater than or equal to about 2 microns and less than or equal to about 200 microns). Other ranges are also possible. The choice of the thickness may depend on cell design parameters such as the desired cycle life, cell capacity, the desired anode to cathode balance, and other appropriate parameters.

The electroactive material layer may be formed using physical vapor deposition, sputtering, chemical deposition, electrochemical deposition, thermal evaporation, jet vapor deposition, laser ablation, or any other appropriate method. The electroactive material layer may be embodied by any appropriate structure including, but not limited to: a foil; a coating on an underlying substrate; a composite (e.g. lithium metal including a nanomaterial such as silicon or graphite particles or a three-dimensional structure of carbon and/or graphite in the form of a fiber mat or nanowires attached to a substrate); or any other appropriate structure.

In addition to the above, it may be desirable to reduce the cell internal resistance when a buffer layer is included in an electrode or electrochemical cell. In such embodiments, it may be desirable to provide a relatively thin buffer layer to limit the cell internal resistance due to inclusion of the buffer layer. In some embodiments, the buffer layer may have a thickness that is less than or equal to about 2 µm, less than or equal to about 1 µm, less than or equal to about 900 nm, less than or equal to about 800 nm, less than or equal to about 700 nm, less than or equal to about 600 nm, less than or equal to about 500 nm, less than or equal to about 400 nm, less than or equal to about 300 nm, less than or equal to about 200 nm, less than or equal to about 100 nm, less than or equal to about 50 nm, or any other appropriate thickness. Correspondingly, the buffer layer may have a thickness that is greater than or equal to about 50 nm, greater than or equal to about 100 nm, greater than or equal to about 200 nm, greater than or equal to about 300 nm, greater than or equal to about 400 nm, greater than or equal to about 500 nm, greater than or equal to about 600 nm, greater than or equal to about 700 nm, or any other appropriate thickness. Combinations of the above are possible (e.g. a buffer layer thickness of greater than or equal to about 100 nm and less than or equal to about 1 µm). Other ranges are also possible.

The buffer layer may be deposited by any suitable method such as sputtering, electron beam evaporation, vacuum thermal evaporation, laser ablation, chemical vapor deposition (CVD), thermal evaporation, plasma enhanced chemical vacuum deposition (PECVD), laser enhanced chemical vapor deposition, and jet vapor deposition. The technique used may depend on the type of material being deposited, the thickness of the layer, and other appropriate considerations.

The protective layer may be made from any suitable material capable of substantially isolating the electroactive material layer from the electrolyte present in an electrochemical cell and that is conductive to the electroactive species. In some embodiments, the protective layer may also be referred to as a "single-ion conductive material layer". The protective layer may also be electrically insulating. In some embodiments, the protective layer is a ceramic, a glassy-ceramic, or a glass. With respect to the current discussion regarding lithium metal based electrode structures, suitable materials for the protective layer may include, but are not limited to, lithium nitride, lithium silicate, lithium borate, lithium aluminate, lithium phosphate, lithium silicosulfide, lithium germanosulfide, lithium lanthanum oxides, lithium titanium oxides, lithium borosulfide, lithium aluminosulfide, lithium phosphosulfide, lithium oxynitride, lithium phosphorus oxynitride and combinations thereof. Various other lithium conductive materials that are reactive with metallic lithium could also be used for the protective layer as the current disclosure is not limited in this fashion.

Suitable materials for a current collector include, but are not limited to: metals (e.g., copper, nickel, aluminum, passivated metals, and other appropriate metals); metallized polymers; electrically conductive polymers; polymers including conductive particles dispersed therein; and other appropriate materials. In some embodiments, the current collector is deposited onto the electroactive material layer using physical vapor deposition, chemical vapor deposition, electrochemical deposition, sputtering, doctor blading, flash evaporation, or any other appropriate deposition technique for the selected material. Alternatively, the current collector might be formed separately and bonded to the electrode structure using any appropriate method.

Figure 2:
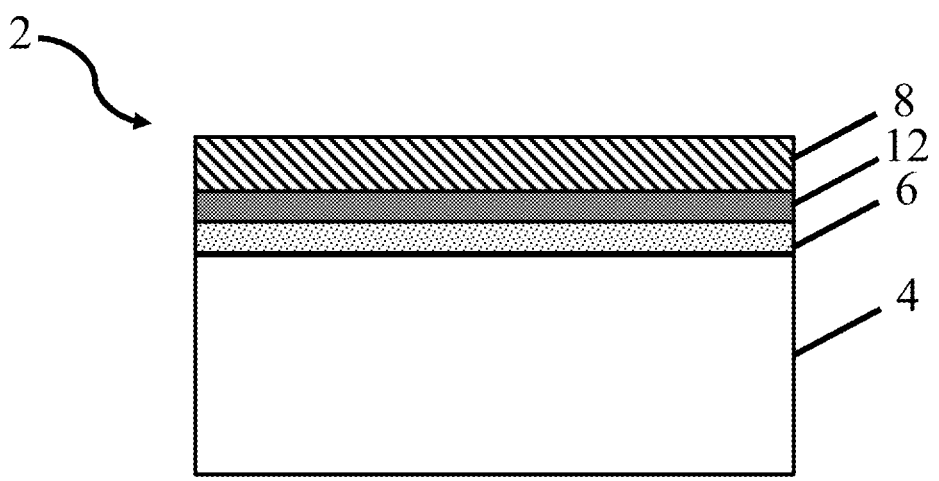
FIG. 2 is a schematic representation of an electrode structure incorporating a protective layer deposited on a buffer layer and an intermediate layer according to one set of embodiments.

As described herein, in some embodiments it is desirable that the protective layer 8 be substantially continuous and nonporous in order to protect the underlying electroactive material layer from the electrolyte in an electrochemical cell. Further, in some embodiments, it is also desirable that the protective layer be substantially compatible with the buffer layer in order to form a stable final electrode structure. However, in some cases, the protective layer is not substantially compatible with the buffer layer. In such an embodiment, an intermediate layer 12, as depicted in FIG. 2, that is compatible with both the buffer layer and the protective layer, may be disposed between the buffer layer and protective layer to provide a stable final electrode structure. Examples of intermediate layers include polymeric layers, glassy layers, ceramic layers, and glassy-ceramic layers.

In some embodiments, the protective layer may exhibit ion conductivities relative to the electroactive species greater than or equal to about $10^{-7}$ S/cm, greater than or equal to about $10^{-6}$ S/cm, greater than or equal to about $10^{-5}$ S/cm, greater than or equal to about $10^{-4}$ S/cm, greater than or equal to about $10^{-3}$ S/cm, or any other appropriate conductivity. Correspondingly, the protective layer may exhibit conductivities of less than or equal to about $10^{-1}$ S/cm, less than or equal to about $10^{-2}$ S/cm, less than or equal to about $10^{-3}$ S/cm, less than or equal to about $10^{-4}$ S/cm, or any other appropriate conductivity. Combinations of the above are possible (e.g., a conductivity of greater than or equal to about $10^{-6}$ S/cm and less than or equal to about $10^{-1}$ S/cm). Other ranges are also possible.

Similar to the buffer layer, it may be desirable to reduce the cell internal resistance when the protective layer is included in an electrode or electrochemical cell. Therefore, it may be desirable to provide a relatively thin protective layer to limit the cell internal resistance due to inclusion of the protective layer. In some embodiments, the protective layer may have a thickness that is less than or equal to about 10 times the thickness of the buffer layer, less than or equal to about 5 times the thickness of the buffer layer, less than or equal to about 4.5 times the thickness of the buffer layer, less than or equal to about 4 times the thickness of the buffer layer, less than or equal to about 3.5 times the thickness of the buffer layer, less than or equal to about 3 times the thickness of the buffer layer, less than or equal to about 2 times the thickness of the buffer layer, less than or equal to about the thickness of the buffer layer, or any other appropriate thickness. Correspondingly, the protective layer may have a thickness that is greater than or equal to about 0.1 times the thickness of the buffer layer, greater than or equal to about 0.2 times the thickness of the buffer layer, greater than or equal to about 0.5 times the thickness of the buffer layer, greater than or equal to about the thickness of the buffer layer, greater than or equal to about 2 times the thickness of the buffer layer, greater than or equal to about 2.5 times the thickness of the buffer layer, greater than or equal to about 3 times the thickness of the buffer layer, greater than or equal to about 3.5 times the thickness of the buffer layer, greater than or equal to about 4 times the thickness of the buffer layer, greater than or equal to about 4.5 times the thickness of the buffer layer, or any other appropriate thickness. Combinations of the above are possible (e.g. a protective layer thickness that is greater than or equal to about 2 times the thickness of the buffer layer and less than or equal to about 10 times the thickness of the buffer layer). Other ranges are also possible.

In addition to the above, in other embodiments, the protective layer may have a thickness that is less than or equal to about 2 μm, less than or equal to about 1 μm, less than or equal to about 900 nm, less than or equal to about 800 nm, less than or equal to about 700 nm, less than or equal to about 600 nm, less than or equal to about 500 nm, less than or equal to about 400 nm, less than or equal to about 300 nm, less than or equal to about 200 nm, less than or equal to about 100 nm, less than or equal to about 50 nm, or any other appropriate thickness. Correspondingly, the protective layer may have a thickness that is greater than or equal to about 50 nm, greater than or equal to about 100 nm, greater than or equal to about 200 nm, greater than or equal to about 300 nm, greater than or equal to about 400 nm, greater than or equal to about 500 nm, greater than or equal to about 600 nm, greater than or equal to about 700 nm, or any other appropriate thickness. Combinations of the above are possible (e.g. a protective layer thickness of greater than or equal to about 100 nm and less than or equal to about 1 μm, or a protective layer thickness of greater than or equal to about 100 nm and less than or equal to about 200 nm). Other ranges are also possible.

In some embodiments, the charge transfer resistance across the protective layer and buffer layer is less than the charge transfer resistance across the buffer layer without the protective layer. Without wishing to be bound by theory, by using a protective layer with a lower interfacial impedance with the electrolyte than the interfacial impedance between the buffer layer and the electrolyte, the total charge transfer resistance of the cell can be reduced. The specific resistance values will depend on the conductivities of the specific protective layer and buffer layer used in the electrode. For example, as described in more detail below in the examples, the resistance value for a lithium oxide layer alone in a particular cell is about 6 $\Omega/cm^2$. This may be compared with a resistance value of about 2 $\Omega/cm^2$ when a protective nitride layer is disposed on a lithium oxide buffer layer. When the nitride layer is coated onto the lithium oxide buffer layer, it is believed that the charge transfer of Li ions across the solvent/ceramic interface is made easier. Again, without wishing to be bound by theory, the resistance of the solvent/ceramic interface is much greater than the ceramic/ceramic and ceramic/lithium metal interfaces. Therefore, reducing the resistance of the solvent/ceramic interface may result in beneficial reduction in the overall cell resistance.

In some embodiments, the protective layer may have an Ra of less than or equal to about 500 nm, less than or equal to about 400 nm, less than or equal to about 300 nm, less than or equal to about 200 nm, less than or equal to about 150 nm, less than or equal to about 140 nm, less than or equal to about 130 nm, less than or equal to about 120 nm, less than or equal to about 110 nm, or any other appropriate surface roughness. Correspondingly, the protective layer may have an arithmetic mean surface roughness (Ra) that is greater than or equal to about 50 nm, greater than or equal to about 60 nm, greater than or equal to about 70 nm, greater than or equal to about 80 nm, greater than or equal to about 90 nm, greater than or equal to about 100 nm, greater than or equal to about 110 nm, greater than or equal to about 120 nm, greater than or equal to about 130 nm, greater than or equal to about 140 nm, greater than or equal to about 150 nm, greater than or equal to about 200 nm, or any other appropriate surface roughness. Correspondingly, Combinations of the above are possible (e.g. a protective layer with an Ra greater than or equal to about 50 nm and less than or equal to about 150 nm). Other ranges are also possible. Further, while roughnesses greater than those noted above might be used, it should also be noted that roughnesses less than those noted above may also be beneficial.

Similar to the buffer layer, the protective layer may be deposited by any suitable method such as sputtering, electron beam evaporation, vacuum thermal evaporation, laser ablation, chemical vapor deposition (CVD), thermal evaporation, plasma enhanced chemical vacuum deposition (PECVD), laser enhanced chemical vapor deposition, and jet vapor deposition. The technique used may depend on the type of material being deposited, the thickness of the layer, and other appropriate considerations.

While a single protective layer has been depicted in the figures, embodiments in which multiple protective layers, or a multilayer protective structure, are used are also envisioned. For instance, in certain embodiments, an electrode structure or electrochemical cell may include more than one protective layer protecting the anode, and each protective layer may have a range of thickness, conductivity, and/or arithmetic mean surface roughness described herein. Each of the protective layers may be formed of the same material, or different materials.

In some embodiments, a protective layer can be separated from another protective layer by an intervening layer, such as a polymer layer. Possible multilayer structures can include arrangements of polymer layers and single ion conductive layers as described in more detail in U.S. patent application Ser. No. 12/862,528, filed on Aug. 24, 2010, published as U.S. Pub. No. 2011/0177398, entitled "Electrochemical Cell", which is incorporated herein by reference in its entirety for all purposes. For example, a multilayer protective layer may include alternating single-ion conductive layer(s) and polymer layer(s) in some embodiments. Other examples and configurations of possible multilayer structures are also described in more detail in U.S. patent application Ser. No. 11/400,781, filed Apr. 6, 2006, published as U.S. Pub. No. 2007-0221265, and entitled, "Rechargeable Lithium/Water, Lithium/Air Batteries" to Affinito et al., which is incorporated herein by reference in its entirety for all purposes.

In some embodiments, a protective layer that includes some porosity can be treated with a polymer or other material such that pinholes and/or nanopores of the protective layer may be filled with the polymer. Examples of techniques for forming such structures are described in more detail in U.S. patent application Ser. No. 12/862,528, filed on Aug. 24, 2010, published as U.S. Pub. No. 2011/0177398, entitled "Electrochemical Cell" and U.S. patent application Ser. No. 11/400,781, filed Apr. 6, 2006, published as U.S. Pub. No. 2007-0221265, and entitled, "Rechargeable Lithium/Water, Lithium/Air Batteries" to Affinito et al., which are incorporated herein by reference in its entirety for all purposes.

A multilayer protective layer can act as a superior permeation barrier by decreasing the direct flow of species to the electroactive material layer, since these species have a tendency to diffuse through defects or open spaces in the layers. Consequently, dendrite formation, self-discharge, and loss of cycle life can be reduced. Another advantage of a multilayer protective layer includes the mechanical properties of the structure. The positioning of a polymer layer adjacent a single-ion conductive layer can decrease the tendency of the single-ion conductive layer to crack, and can increase the barrier properties of the structure. Thus, these laminates may be more robust towards stress due to handling during the manufacturing process than structures without intervening polymer layers. In addition, a multilayer protective layer can also have an increased tolerance of the volumetric changes that accompany the migration of lithium back and forth from the electroactive material layer during the cycles of discharge and charge of the cell.

Without wishing to be bound by theory, grain boundaries located within the buffer layer and/or the protective layer may act as diffusion barriers to the electroactive species which may increase the cell internal resistance. Therefore, while in some embodiments the buffer layer and/or protective layer may comprise, or be substantially formed, of crystalline and/or polycrystalline materials, in other embodiments, the buffer layer and/or protective layer may comprise or be substantially formed of an amorphous material. For example, the buffer layer and/or protective layer may be a partially, or substantially, amorphous material layer. Without wishing to be bound by theory, by making one or both layers partially or substantially amorphous, the number of grain boundaries is reduced, as compared to a layer that is relatively more crystalline and/or polycrystalline, which may lead to a decrease in the observed cell internal resistance. Embodiments in which one of the buffer layer and the protective layer is partially, or substantially, amorphous and the other is substantially crystalline and/or polycrystalline are envisioned. Embodiments in which both the protective layer and the buffer layer are partially, or substantially, amorphous are also envisioned. Any number of different detection methods may be utilized to determine whether the buffer layer is amorphous, partial amorphous, crystalline, or polycrystalline. Appropriate tests may include, but are not limited to, x-ray diffraction, X-ray photoelectron spectroscopy, transmission electron microscopy, differential scanning calorimetry, and light spectroscopy.

The buffer layer and the protective layer may be made partially, or substantially, amorphous using any appropriate method. For example, deposition of compositions that are slightly off stoichiometric ratios may favor deposition of an amorphous material. In one exemplary embodiment, a substantially amorphous buffer layer comprises one or more materials that include nitrogen and oxygen (e.g., lithium oxynitride), such that a molar ratio of nitrogen to oxygen in the buffer layer is less than or equal to about 3:1, 2:1, or 1:1 and greater than or equal to about 1:2, 1:1, or 2:1 though any appropriate molar ratio could be used. Combinations of the above ranges are possible (e.g., a ratio of nitrogen to oxygen that is less than or equal to about 3:1 and greater than or equal to about 1:2). Additionally or alternatively, the buffer layer may include a material that includes carbon, such as lithium carbonate, or another carbonaceous material, such that a molar ratio of lithium and carbon in the buffer layer is less than or equal to about 2:1, 1.75:1, 1.5:1, or 1.25:1 and greater than or equal to about 1:1, 1.25:1, 1.5:1, or 1.75:1, though any appropriate molar ratio could be used. Combinations of the above ranges are possible (e.g., a ratio of lithium to carbon that is less than or equal to about 2:1 and greater than or equal to about 1:1). In some embodiments, the buffer layer may include lithium carbonate, or another carbonaceous material, as a second component in the buffer layer. For example, lithium carbonate, or another carbonaceous material, might be co-deposited as a second component of a buffer layer, as noted in more detail below.

In another embodiment, the buffer layer may comprise or formed from a material including lithium, nitrogen, and oxygen. For example, the lithium content of the buffer layer may be greater than or equal to about 1%, 2%, 3%, 4%, 5%, 10%, 15%, 20%, 25%, 35%, 40%, 45%, 50%, or any other appropriate percentage (e.g., wt % or mol %). Correspondingly, the buffer layer may include a lithium content that is less than or equal to about 75%, 70%, 65%, 60%, 55%, 50%, 45%, 40%, 35%, 30%, 25%, 20%, 15%, 10%, 5%, or any other appropriate percentage (e.g., wt % or mol %). Combinations of the above-referenced ranges are also possible (e.g., a lithium content of greater than or equal to about 1% and less than or equal to about 50%). Other ranges are also possible.

In addition to the lithium content, the buffer layer may include a nitrogen content that is greater than or equal to about 0%, 1%, 2%, 3%, 4%, 5%, 10%, 15%, 20%, 25%, 35%, 40%, or any other appropriate percentage (e.g., wt % or mol %). The buffer layer may also include a nitrogen content that is less than or equal to about 50%, 45%, 40%, 35%, 30%, 25%, 20%, 15%, 10%, 5%, or any other appropriate percentage (e.g., wt % or mol %). Combinations of the above-referenced ranges are also possible (e.g., a nitrogen content of greater than or equal to about 1% and less than or equal to about 50%). Other ranges are also possible.

The oxygen content of the buffer layer may be greater than or equal to about 0%, 1%, 2%, 3%, 4%, 5%, 10%, 15%, 20%, 25%, 35%, 40%, 45%, 50%, 55%, 60%, or any other appropriate percentage (e.g., wt % or mol %). The buffer layer may also include an oxygen content that is less than or equal to about 70%, 65%, 6%, 55%, 50%, 45%, 40%, 35%, 30%, 25%, 20%, 15%, 10%, 5%, or any other appropriate percentage (e.g., wt % or mol %). Combinations of the above-referenced ranges are also possible (e.g., an oxygen content of greater than or equal to about 1% and less than or equal to about 70%). Other ranges are also possible.

The above ranges of elemental materials may be combined to provide a number of different buffer layer compositions. For example, the buffer layer might have a composition including between about 1% to about 75% lithium, about 0% to about 50% nitrogen, and about 0% to about 70% oxygen. Other combinations of the above ranges of elemental materials are also possible. Additionally, in some embodiments, the above compositions might be combined with the use of dopants or other suitable additions.

In another exemplary embodiment, a substantially amorphous protective layer may comprise a material that includes lithium and nitrogen (e.g., lithium nitride) such that a molar ratio of lithium to nitrogen in the protective layer is less than or equal to about 3:1 (e.g., less than or equal to about 2.5:1, less than or equal to about 2:1, or less than or equal to about 1.5:1) and greater than or equal to about 1:1 (e.g., greater than or equal to about 1.5:1, or greater than or equal to about 2:1). While a specific protective layer including lithium nitride is noted above, other conductive ceramics can be used including, but not limited to, lithium silicate, lithium borate, lithium aluminate, lithium phosphate, lithium phosphorus oxynitride, lithium silicosulfide, lithium germanosulfide, lithium oxides, lithium lanthanum oxides, lithium titanium oxides, lithium borosulfide, lithium aluminosulifide, lithium phosphosulfide, lithium halides, and combinations of the above.

Without wishing to be bound by theory, formation of an amorphous phase when depositing nonstoichiometric compositions may be due to any number of physical phenomena including, but not limited to, competing equilibrium phases, quasi-crystal formation, frustration of crystal formation, and other applicable phenomena.

In some embodiments, the buffer layer and/or the protective layer may include dopants to alter the electrical conductivity and/or conductivity relative to the electroactive species. Possible dopants include carbon, nitrogen, and sulfur-based compounds as well as other appropriate compounds. Specific examples include, but are not limited to, lithium carbonates, lithium nitrates, sulfides, and elemental sulfur. Depending upon the deposition method used, the dopants may either be specific additions made to the buffer layer and/or protective layer, or the dopants may be deposited as a byproduct of the deposition method used. For example, lithium carbonates may be formed during the deposition of a lithium oxide buffer layer when a mixture of carbon dioxide gas and lithium vapor are subjected to a plasma assisted deposition process. While a specific example is given above, it should be understood that any number of appropriate methods could be used to provide the desired doping of a protective layer and/or buffer layer.

Figure 3:
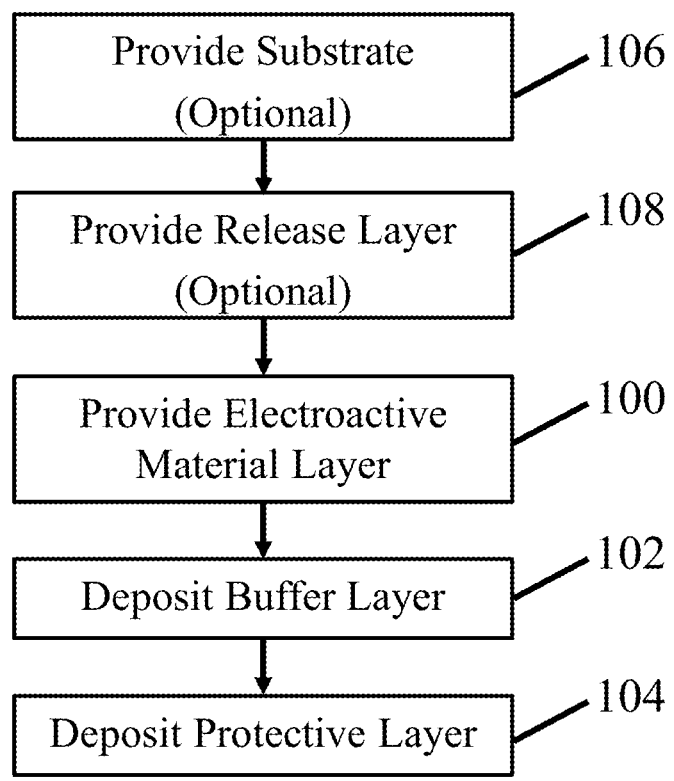
FIG. 3 is a representative flow diagram of a method to form an electrode structure according to one set of embodiments.

Turning now to FIG. 3, one embodiment of a method for producing the electrode structures described herein is provided. In the depicted method, an electroactive material layer may be provided at step 100. Subsequently, a buffer layer and a protective layer are subsequently deposited onto the underlying electroactive material layer in steps 102 and 104. In some embodiments, an optional substrate corresponding to a current collector, a carrier substrate, and/or a structural substrate may be provided at step 106 and an optional release layer may be provided at step 108 as described in more detail below. Depending upon the particular embodiment, the substrate and/or release layer may be provided prior to, or subsequent to, providing the electroactive material layer, depositing the buffer layer, or depositing the protective layer. Further, as described in more detail below, the substrate and release layer may either be positioned relative to a surface of the electroactive material layer or the protective layer as the current disclosure is not limited as to where the substrate and release layer may be located.

Figure 4A:
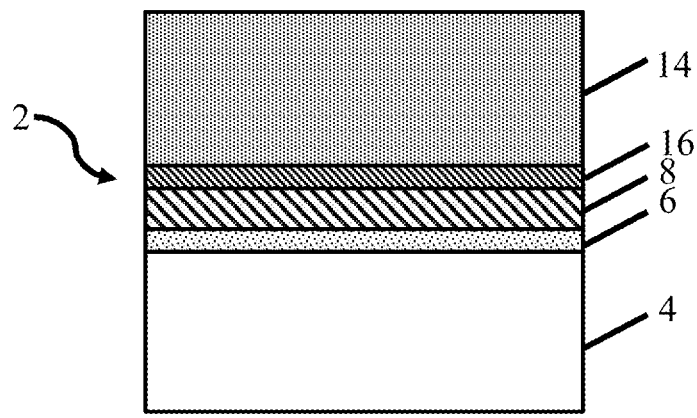
FIG. 4A is a schematic representation of an electrode structure incorporating a release layer and carrier substrate attached to a protective layer according to one set of embodiments.
Figure 4B:
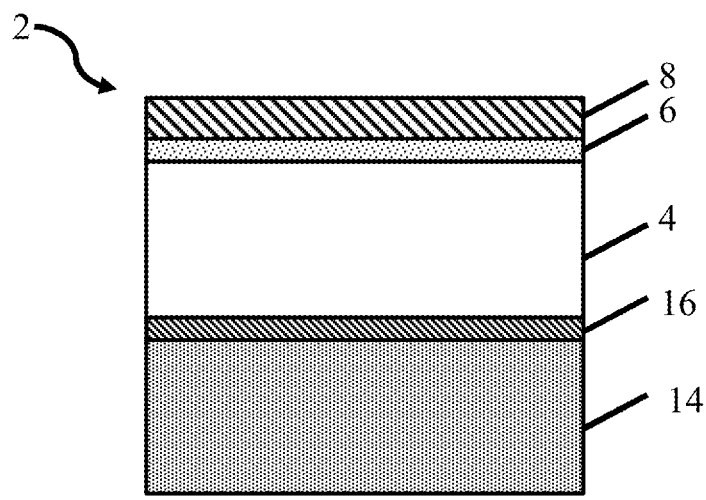
FIG. 4B is a schematic representation of an electrode structure incorporating a release layer and a carrier substrate attached to the bottom surface of an electroactive layer according to one set of embodiments.
Figure 4C:
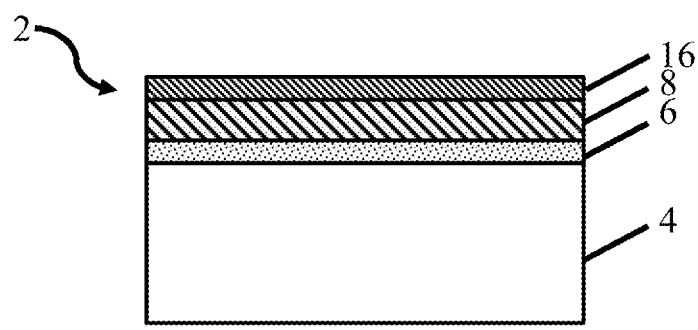
FIG. 4C is a schematic representation of an electrode structure with a release layer incorporated in a final electrode structure according to one set of embodiments.

As shown in the embodiment illustrated in FIGS. 4A-4C, in some cases, it may be desirable to provide a carrier substrate 14 and a release layer 16 to facilitate handling of the electrode structure during manufacture and assembly. As described in more detail below, depending upon the particular embodiment, the carrier substrate 14 and release layer 16 may be disposed on an exterior surface of the protective layer 8 (FIG. 4A) or on a bottom surface of the electroactive material layer 4 (FIG. 4B). After release of the carrier substrate, a final electrode structure may be formed, as shown illustratively in FIG. 4C.

As described herein, a release layer may be positioned on a carrier substrate to facilitate fabrication of an electrode. Any suitable material can be used as a carrier substrate. In some embodiments, the material (and thickness) of a carrier substrate may be chosen at least in part due to its ability to withstand certain processing conditions such as high temperature. The substrate material may also be chosen at least in part based on its adhesive affinity to a release layer. In some cases, a carrier substrate is a polymeric material. Examples of suitable materials that can be used to form all or portions of a carrier substrate include certain of those described herein suitable as release layers, optionally with modified molecular weight, cross-linking density, and/or addition of additives or other components. In certain embodiments, a carrier substrate may comprise a polyester such as polyethylene terephthalate (PET) (e.g., optical grade polyethylene terephthalate); a polyamide; or another suitable polymer. In other cases, a carrier substrate may comprise a metal such as copper or titanium or a ceramic material such as a glass. A carrier substrate may also include additional components such as fillers, binders, and/or surfactants.

A carrier substrate may have any suitable thickness. For instance, the thickness of a carrier substrate may greater than or equal to about 5 microns, greater than or equal to about 15 microns, greater than or equal to about 25 microns, greater than or equal to about 50 microns, greater than or equal to about 75 microns, greater than or equal to about 100 microns, greater than or equal to about 200 microns, greater than or equal to about 500 microns, or greater than or equal to about 1 mm. In some embodiments, the carrier substrate may have a thickness of less than or equal to about 10 mm, less than or equal to about 5 mm, less than or equal to about 3 mm, or less than or equal to about 1 mm. Combinations of the above-referenced ranges are also possible (e.g., greater than or equal to about 100 microns and less than or equal to about 1 mm.) Other ranges are also possible. In some cases, the carrier substrate has a thickness that is equal to or greater than the thickness of the release layer.

In the depicted embodiments shown in FIGS. 4A and 4B, release layer 16 may have a relatively high adhesive strength to one of carrier substrate 14 and protective layer 8 or electroactive material layer 4, and a relatively moderate or poor adhesive strength to the other of carrier substrate 14 and protective layer 8 or electroactive material layer 4. Consequently, the release layer can function to facilitate the delamination of carrier substrate from the final electrode structure when a peel force is applied to either the carrier substrate and/or to the electrode structure.

Depending on which component the release layer shows a relatively high adhesive strength to, the release layer may, or may not be, incorporated within the final electrode structure. Whether or not the release layer is incorporated into the final electrode structure can be varied by tailoring the chemical and/or physical properties of the release layer. For example, if it is desirable for release layer 16 to be part of the final electrode structure, the release layer may be tailored to have a greater adhesive strength to protective layer 8 relative to its adhesive strength to carrier substrate 14. Consequently, when a delamination force is applied to the carrier substrate (and/or to the electrode structure), carrier substrate 14 is delaminated from the electrode structure and release layer 16 is retained with the electrode structure (see FIG. 4C).

In embodiments in which the release layer is incorporated into a final electrochemical cell, the release layer may be formed of a material that is stable in the electrolyte and does not substantially interfere with the structural integrity of the electrode. In certain embodiments in which the release layer is incorporated into the final electrode structure or electrochemical cell, the release layer may serve as an electrolyte (e.g., a polymer gel electrolyte) to facilitate the conduction of ions, or it may function as a separator. Other uses of the release layer are also possible. In certain particular embodiments, the release layer is formed of a polymer gel that is conductive to lithium ions and/or contains lithium ions.

On the other hand, if it is desirable for the release layer to not be part of a final electrode structure, the release layer may be designed to have a greater adhesive strength to carrier substrate 14 relative to its adhesive strength to protective layer 8 or the electroactive material layer 4. In such an embodiment, when a delamination force is applied to the carrier substrate, carrier substrate 14 and release layer 16 are delaminated from the electrode structure resulting in a structure similar to that of FIGS. 1 and 2.

The release layer may be formed using any appropriate material exhibiting the desired release properties relative to the carrier substrate and protective layer and conductivity. The specific material to be used will depend, at least in part, on factors such as the particular type of carrier substrate used, the material in contact with the other side of the release layer, whether the release layer is to be incorporated into the final electrode structure, and whether the release layer has an additional function after being incorporated into the electrochemical cell.

In one set of embodiments, the release layer is formed of a polymeric material. When polymers are used, the polymer may be substantially crosslinked, substantially uncrosslinked, or partially crosslinked as the current disclosure is not limited in this fashion. Specific examples of appropriate polymers include, but are not limited to, polyoxides, polysulfones, polyalcohols, polyurethanes, polyamides, and perfluorated polymers. The polymer may be in the form of, for example, a solid polymer (e.g., a solid polymer electrolyte), a glassy-state polymer, or a polymer gel.

In some embodiments, the release layer includes a polymer that is conductive to certain ions (e.g., alkali metal ions) but is also substantially electrically conductive. Examples of such materials include electrically conductive polymers (also known as electronic polymers or conductive polymers) that are doped with lithium salts (e.g., LiSCN, LiBr, LiI, LiClO$_4$, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, and LiN(SO$_2$CF$_3$)$_2$). Conductive polymers are known in the art; examples of such polymers include, but are not limited to, poly(acetylene)s, poly(pyrrole)s, poly(thiophene)s, poly(aniline)s, poly(fluorene)s, polynaphthalenes, poly(p-phenylene sulfide), and poly(para-phenylene vinylene)s. Electrically-conductive additives may also be added to polymers to form electrically-conductive polymers.

In some embodiments, a release layer includes a polymer that is conductive to one or more types of ions. In some cases, the release layer may be substantially non-electrically conductive. Examples of ion-conductive species (that may be substantially non-electrically conductive) include non-electrically conductive materials (e.g., electrically insulating materials) that are doped with lithium salts. E.g., acrylate, polyethyleneoxide, silicones, polyvinylchlorides, and other insulating polymers that are doped with lithium salts can be ion-conductive (but substantially non-electrically conductive). Additional examples of polymers include ionically conductive polymers, sulfonated polymers, and hydrocarbon polymers. Suitable ionically conductive polymers may include, e.g., ionically conductive polymers known to be useful in solid polymer electrolytes and gel polymer electrolytes for lithium electrochemical cells, such as, for example, polyethylene oxides. Suitable sulfonated polymers may include, e.g., sulfonated siloxane polymers, sulfonated polystyrene-ethylene-butylene polymers, and sulfonated polystyrene polymers. Suitable hydrocarbon polymers may include, e.g., ethylene-propylene polymers, polystyrene polymers, and the like.

A release layer can also include crosslinked polymer material formed from the polymerization of monomers such as alkyl acrylates, glycol acrylates, polyglycol acrylates, polyglycol vinyl ethers, polyglycol divinyl ethers, and those described in U.S. Pat. No. 6,183,901 to Ying et al. of the common assignee for protective coating layers for separator layers. For example, one such crosslinked polymer material is polydivinyl poly(ethylene glycol). The crosslinked polymer materials may further comprise salts, for example, lithium salts, to enhance ionic conductivity.

Other classes of polymers that may be suitable for use in a release layer include, but are not limited to, polyamines (e.g., poly(ethylene imine) and polypropylene imine (PPI)); polyamides (e.g., polyamide (Nylon), poly(ϵ-caprolactam) (Nylon 6), poly(hexamethylene adipamide) (Nylon 66)), polyimides (e.g., polyimide, polynitrile, and poly(pyromellitimide-1,4-diphenyl ether) (Kapton)); vinyl polymers (e.g., polyacrylamide, poly(2-vinyl pyridine), poly(N-vinylpyrrolidone), poly(methylcyanoacrylate), poly(ethylcyanoacrylate), poly(butylcyanoacrylate), poly(isobutylcyanoacrylate), poly(vinyl acetate), poly (vinyl alcohol), poly(vinyl chloride), poly(vinyl fluoride), poly(2-vinyl pyridine), vinyl polymer, polychlorotrifluoro ethylene, and poly(isohexylcynaoacrylate)); polyacetals; polyolefins (e.g., poly(butene-1), poly(n-pentene-2), polypropylene, polytetrafluoroethylene); polyesters (e.g., polycarbonate, polybutylene terephthalate, polyhydroxybutyrate); polyethers (poly(ethylene oxide) (PEO), poly(propylene oxide) (PPO), poly(tetramethylene oxide) (PTMO)); vinylidene polymers (e.g., polyisobutylene, poly(methyl styrene), poly(methylmethacrylate) (PMMA), poly(vinylidene chloride), and poly(vinylidene fluoride)); polyaramides (e.g., poly(imino-1,3-phenylene iminoisophthaloyl) and poly(imino-1,4-phenylene iminoterephthaloyl)); polyheteroaromatic compounds (e.g., polybenzimidazole (PBI), polybenzobisoxazole (PBO) and polybenzobisthiazole (PBT)); polyheterocyclic compounds (e.g., polypyrrole); polyurethanes; phenolic polymers (e.g., phenol-formaldehyde); polyalkynes (e.g., polyacetylene); polydienes (e.g., 1,2-polybutadiene, cis or trans-1,4-polybutadiene); polysiloxanes (e.g., poly(dimethylsiloxane) (PDMS), poly(diethylsiloxane) (PDES), polydiphenylsiloxane (PDPS), and polymethylphenylsiloxane (PMPS));

and inorganic polymers (e.g., polyphosphazene, polyphosphonate, polysilanes, polysilazanes).

The polymer materials listed above and described herein may further comprise salts, for example, lithium salts (e.g., LiSCN, LiBr, LiI, LiClO$_4$, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, and LiN(SO$_2$CF$_3$)$_2$), to enhance ionic conductivity.

Other criteria for selecting a material suitable for a release layer, tests for adequate adhesion of the release layer, and methods for forming a release layer are described in more detail in U.S. patent application Ser. No. 12/862,513, filed on Aug. 24, 2010, published as U.S. Pub. No. 2011/068001, entitled "Release System for Electrochemical Cells", which is incorporated herein by reference in its entirety for all purposes.

In embodiments in which the release layer is incorporated into the final electrode structure, it may be desirable to provide a release layer capable of functioning as a separator within an electrochemical cell. In such an embodiment, the release layer is conductive to the electroactive species of the electrochemical cell. Conductivity of the release layer may, for example, be provided either through intrinsic conductivity of the material in the dry state, or the release layer may comprise a polymer that is capable of being swollen by an electrolyte to form a gel polymer exhibiting conductivity in the wet state. While materials exhibiting any amount of ion conductivity could be used in such an embodiment, in some embodiments, the release layer is made from a material that may exhibit ion conductivities of, e.g., greater than or equal to about $10^{-7}$ S/cm, greater than or equal to about $10^{-6}$ S/cm, greater than or equal to about $10^{-5}$ S/cm, greater than or equal to about $10^{-4}$ S/cm, or any other appropriate ion conductivity in either the dry or wet state. Correspondingly, the release layer may exhibit ion conductivities of less than or equal to about $10^{-3}$ S/cm, less than or equal to about $10^{-4}$ S/cm, less than or equal to about $10^{-5}$ S/cm, less than or equal to about $10^{-6}$, or any other appropriate ion conductivity in either the dry or wet state. Combinations of the above are possible (e.g., an ion conductivity of greater than or equal to about $10^{-6}$ S/cm and less than or equal to about $10^{-3}$ S/cm). Other ranges are also possible.

In certain embodiments in which the release layer is incorporated into the final electrode structure and/or electrochemical cell, the release layer is designed to have the ability to withstand the application of a force or pressure applied to the electrochemical cell or a component of the cell during cycling of the cell. The pressure may be an externally-applied (e.g., in some embodiments, uniaxial) pressure. The externally-applied pressure may, in some embodiments, be chosen to be greater than the yield stress of a material forming the electroactive material layer. For example, in embodiments in which the electroactive material layer comprises lithium, the applied pressure applied to the cell may be greater than or equal to about 5 kg/cm$^2$ In some embodiments, the applied pressure may be greater than or equal to about 5 kg/cm$^2$, greater than or equal to about 6 kg/cm$^2$, greater than or equal to about 7 kg/cm2, greater than or equal to about 8 kg/cm$^2$, greater than or equal to about 9 kg/cm$^2$, or any other appropriate pressure. Correspondingly, the applied pressure may be less than or equal to about 20 kg/cm$^2$, less than or equal to about 10 kg/cm$^2$, less than or equal to about 9 kg/cm$^2$, less than or equal to about 8 kg/cm$^2$, less than or equal to about 7 kg/cm$^2$, less than or equal to about 6 kg/cm$^2$, or any other appropriate pressure. Combinations of the above are possible (e.g. an applied pressure of greater than or equal to about 5 kg/cm$^2$ and less than or equal to about 10 kg/cm$^2$). Other ranges are also possible. Suitable structures for applying an appropriate pressure to the electrochemical cell are described in more detail in U.S. patent application Ser. No. 12/862,528, filed on Aug. 24, 2010, published as U.S. Pub. No. 2011/0177398, entitled "Electrochemical Cell", which is incorporated herein by reference in its entirety for all purposes.

The electrode structures described above may generally be used as anodes. Corresponding suitable cathode active materials for use in the cathode of the electrochemical cells described herein include, but are not limited to, electroactive transition metal chalcogenides, electroactive conductive polymers, and electroactive sulfur-containing materials, and combinations thereof. As used herein, the term "chalcogenides" pertains to compounds that contain one or more of the elements of oxygen, sulfur, and selenium. Examples of suitable transition metal chalcogenides include, but are not limited to, the electroactive oxides, sulfides, and selenides of transition metals selected from the group consisting of Mn, V, Cr, Ti, Fe, Co, Ni, Cu, Y, Zr, Nb, Mo, Ru, Rh, Pd, Ag, Hf, Ta, W, Re, Os, and Ir. In one embodiment, the transition metal chalcogenide is selected from the group consisting of the electroactive oxides of nickel, manganese, cobalt, and vanadium, and the electroactive sulfides of iron. In one embodiment, the cathode active layer comprises an electroactive conductive polymer. Examples of suitable electroactive conductive polymers include, but are not limited to, electroactive and electronically conductive polymers selected from the group consisting of polypyrroles, polyanilines, polyphenylenes, polythiophenes, and polyacetylenes.

"Electroactive sulfur-containing materials," as used herein, relates to cathode active materials which comprise the element sulfur in any form, wherein the electrochemical activity involves the breaking or forming of sulfur-sulfur covalent bonds. Suitable electroactive sulfur-containing materials, include, but are not limited to, elemental sulfur and organic materials comprising sulfur atoms and carbon atoms, which may or may not be polymeric. Suitable organic materials include those further comprising heteroatoms, conductive polymer segments, composites, and conductive polymers.

In some embodiments involving Li/S systems, the sulfur-containing material, in its oxidized form, comprises a polysulfide moiety, $S_m$, selected from the group consisting of covalent —$S_m$— moieties, ionic —$S_m$— moieties, and ionic $S_m^{2-}$ moieties, wherein m is an integer equal to or greater than 3. In one embodiment, m of the polysulfide moiety, $S_m$, of the sulfur-containing polymer is an integer equal to or greater than 6. In another embodiment, m of the polysulfide moiety, $S_m$, of the sulfur-containing polymer is an integer equal to or greater than 8. In another embodiment, the sulfur-containing material is a sulfur-containing polymer. In another embodiment, the sulfur-containing polymer has a polymer backbone chain and the polysulfide moiety, $S_m$, is covalently bonded by one or both of its terminal sulfur atoms as a side group to the polymer backbone chain. In yet another embodiment, the sulfur-containing polymer has a polymer backbone chain and the polysulfide moiety, $S_m$, is incorporated into the polymer backbone chain by covalent bonding of the terminal sulfur atoms of the polysulfide moiety.

In one embodiment, the electroactive sulfur-containing material comprises greater than 50% by weight of sulfur. In another embodiment, the electroactive sulfur-containing material comprises greater than 75% by weight of sulfur. In yet another embodiment, the electroactive sulfur-containing material comprises greater than 90% by weight of sulfur.

The nature of the electroactive sulfur-containing materials useful in the practice of this invention may vary widely, as known in the art. In one embodiment, the electroactive sulfur-containing material comprises elemental sulfur. In another embodiment, the electroactive sulfur-containing material comprises a mixture of elemental sulfur and a sulfur-containing polymer.

In other embodiments, an electrochemical cell described herein includes a composite cathode. The composite cathode may include, for example, (a) an electroactive sulfur-containing cathode material, wherein said electroactive sulfur-containing cathode material, in its oxidized state, comprises a polysulfide moiety of the formula —$S_m$—, wherein m is an integer equal to or greater than 3, as described herein; and, (b) an electroactive transition metal chalcogenide composition. The electroactive transition metal chalcogenide composition may encapsulate the electroactive sulfur-containing cathode material. In some cases, it may retard the transport of anionic reduction products of the electroactive sulfur-containing cathode material. The electroactive transition metal chalcogenide composition may comprising an electroactive transition metal chalcogenide having the formula: $M_j Y_k(OR)_l$, wherein M is a transition metal; Y is the same or different at each occurrence and is oxygen, sulfur, or selenium; R is an organic group and is the same or different at each occurrence; j is an integer ranging from 1 to 12; k is a number ranging from 0 to 72; and l is a number ranging from 0 to 72. In some embodiments, k and l cannot both be 0.

In order to retard out-diffusion of anionic reduction products from the cathode compartment in the cell, a sulfur-containing cathode material may be effectively separated from the electrolyte or other layers or parts of the cell by a layer of an electroactive transition metal chalcogenide composition. This layer can be dense or porous.

In one embodiment, a cathode includes a mixture of an electroactive sulfur-containing cathode material, an electroactive transition metal chalcogenide, and optionally binders, electrolytes, and conductive additives, which is deposited onto a current collector. In another embodiment, a coating of the electroactive sulfur-containing cathode material is encapsulated or impregnated by a thin coherent film coating of the cation transporting, anionic reduction product transport-retarding, transition metal chalcogenide composition. In yet another embodiment, a cathode includes particulate electroactive sulfur-containing cathode materials individually coated with an encapsulating layer of the cation transporting, anionic reduction product transport-retarding, transition metal chalcogenide composition. Other configurations are also possible.

In one embodiment, a composite cathode includes particulate sulfur-containing cathode materials, generally less than 10 microns in diameter, individually coated with an encapsulating layer of an alkali-metal cation-transporting, yet anionic reduction product transport-retarding electroactive transition metal chalcogenide composition. The particle may have a "core-shell" configuration, e.g., a core of an electroactive sulfur-containing cathode material and an outer shell of a retarding barrier layer comprising an electroactive transition metal chalcogenide. Optionally, the composite cathode may contain fillers comprising various types of binders, electrolytes and conductive materials such as those described herein.

In certain embodiments, the composite cathode is a particulate, porous electroactive transition metal chalcogenide composition, optionally containing non-electroactive metal oxides, such as silica, alumina, and silicates, that is further impregnated with a soluble electroactive sulfur-containing cathode material. This may be beneficial in increasing the energy density and capacity compared with cathodes including electroactive sulfur-containing cathode material (e.g., electroactive organo-sulfur and carbon-sulfur cathode materials) only.

In one set of embodiments, a composite cathode comprises an electroactive sulfur-containing material (e.g., a carbon-sulfur polymer or elemental sulfur); $V_2O_5$; conductive carbon; and a PEO binder.

Additional arrangements, components, and advantages of composite cathodes are described in more detail in U.S. Pub. No.: 2006/0115579, filed Jan. 13, 2006, entitled "Novel composite cathodes, electrochemical cells comprising novel composite cathodes, and processes for fabricating same", which is incorporated herein by reference in its entirety.

Cathodes may further comprise one or more conductive fillers to provide enhanced electronic conductivity. Conductive fillers can increase the electrically conductive properties of a material and may include, for example, conductive carbons such as carbon black (e.g., Vulcan XC72R carbon black, Printex XE2, or Akzo Nobel Ketjen EC-600 JD), graphite fibers, graphite fibrils, graphite powder (e.g., Fluka #50870), activated carbon fibers, carbon fabrics, non-activated carbon nanofibers. Other non-limiting examples of conductive fillers include metal coated glass particles, metal particles, metal fibers, nanoparticles, nanotubes, nanowires, metal flakes, metal powders, metal fibers, metal mesh. In some embodiments, a conductive filler may include a conductive polymer. Examples of suitable electroactive conductive polymers include, but are not limited to, electroactive and electronically conductive polymers selected from the group consisting of polypyrroles, polyanilines, polyphenylenes, polythiophenes, and polyacetylenes. Other conductive materials known to those of ordinary skill in the art can also be used as conductive fillers. The amount of conductive filler, if present, may be present in the range of 2 to 30% by weight of the cathode active layer. The cathodes may also further comprise other additives including, but not limited to, metal oxides, aluminas, silicas, and transition metal chalcogenides.

Cathodes may also comprise a binder. The choice of binder material may vary widely so long as it is inert with respect to the other materials in the cathode. In some embodiments, the binder material may be a polymeric material. Examples of polymer binder materials include, but are not limited to, polyvinylidene fluoride (PVDF)-based polymers, such as poly(vinylidene fluoride) (PVDF), PVF2 and its co- and terpolymers with hexafluoroethylene, tetrafluoroethylene, chlorotrifluoroethylene, poly(vinyl fluoride), polytetrafluoroethylenes (PTFE), ethylene-tetrafluoroethylene copolymers (ETFE), polybutadiene, cyanoethyl cellulose, carboxymethyl cellulose and its blends with styrene-butadiene rubber, polyacrylonitrile, ethylene-propylene-diene (EPDM) rubbers, ethylene propylene diene terpolymers, styrene-butadiene rubbers (SBR), polyimides or ethylene-vinyl acetate copolymers. In some cases, the binder material may be substantially soluble in aqueous fluid carriers and may include, but is not limited to, cellulose derivatives, typically methylcellulose (MC), carboxy methylcellulose (CMC) and hydroxypropyl methylcellulose (HPMC), polyvinyl alcohol (PVA), polyacrylic acid salts, polyacryl amide (PA), polyvinyl pyrrolidone (PVP) and polyethylene oxides (PEO). In one set of embodiments, the binder material is poly(ethylene-co-propylene-co-5-methylene-2-norbornene) (EPMN), which may be chemically neutral (e.g., inert) towards cell components, including polysulfides. UV curable acrylates, UV curable methacrylates, and heat curable divinyl ethers can also be used. The amount of binder, if present, may be present in the range of 2 to 30% by weight of the cathode active layer.

Other suitable cathode materials are also possible. For instance, cathodes for alkali metal ion batteries (e.g., lithium ion batteries) are also possible.

As noted above, the assembled electrochemical cells include electrolyte in addition to the electrodes and other components present within the cell. The electrolytes used in electrochemical cells can function as a medium for the storage and transport of ions, and in the special case of solid electrolytes and gel electrolytes, these materials may additionally function as a separator between the anode and the cathode. Any suitable liquid, solid, or gel material capable of storing and transporting ions between the anode and the cathode may be used. The electrolyte may be electronically non-conductive to prevent short circuiting between the anode and the cathode. In one set of embodiments a non-aqueous-based electrolyte is used; in another set of embodiments, an aqueous-based electrolyte is used.

In some embodiments, an electrolyte may be present as a polymer layer such as a gel or solid polymer layer. In some cases, in addition to being able to function as a medium for the storage and transport of ions, a polymer layer positioned between an anode and cathode can function to screen the anode (e.g., a base electrode layer of the anode) from any cathode roughness under an applied force or pressure, keeping the anode surface smooth under force or pressure, and stabilizing any multi-layered structures of the anode (e.g., ceramic polymer multi-layer) by keeping the multi-layer pressed between the base electrode layer and the smooth polymer layer. In some such embodiments, the polymer layer may be chosen to be compliant and have a smooth surface.

The electrolyte can comprise one or more ionic electrolyte salts to provide ionic conductivity and one or more liquid electrolyte solvents, gel polymer materials, or polymer materials. Suitable non-aqueous electrolytes may include organic electrolytes comprising one or more materials selected from the group consisting of liquid electrolytes, gel polymer electrolytes, and solid polymer electrolytes. Examples of non-aqueous electrolytes for lithium batteries are described by Dorniney in Lithium Batteries, New Materials, Developments and Perspectives, Chapter 4, pp. 137-165, Elsevier, Amsterdam (1994). Examples of gel polymer electrolytes and solid polymer electrolytes are described by Alamgir et al. in Lithium Batteries, New Materials, Developments and Perspectives, Chapter 3, pp. 93-136, Elsevier, Amsterdam (1994).

Examples of useful non-aqueous liquid electrolyte solvents include, but are not limited to, non-aqueous organic solvents, such as, for example, N-methyl acetamide, acetonitrile, acetals, ketals, esters, carbonates, sulfones, sulfites, sulfolanes, aliphatic ethers, acyclic ethers, cyclic ethers, glymes, polyethers, phosphate esters, siloxanes, dioxolanes, N-alkylpyrrolidones, substituted forms of the foregoing, and blends thereof. Examples of acyclic ethers that may be used include, but are not limited to, diethyl ether, dipropyl ether, dibutyl ether, dimethoxymethane, trimethoxymethane, dimethoxyethane, diethoxyethane, 1,2-dimethoxypropane, and 1,3-dimethoxypropane. Examples of cyclic ethers that may be used include, but are not limited to, tetrahydrofuran, tetrahydropyran, 2-methyltetrahydrofuran, 1,4-dioxane, 1,3-dioxolane, and trioxane. Examples of polyethers that may be used include, but are not limited to, diethylene glycol dimethyl ether (diglyme), triethylene glycol dimethyl ether (triglyme), tetraethylene glycol dimethyl ether (tetraglyme), higher glymes, ethylene glycol divinylether, diethylene glycol divinylether, triethylene glycol divinylether, dipropylene glycol dimethyl ether, and butylene glycol ethers. Examples of sulfones that may be used include, but are not limited to, sulfolane, 3-methyl sulfolane, and 3-sulfolene. Fluorinated derivatives of the foregoing are also useful as liquid electrolyte solvents. Mixtures of the solvents described herein can also be used.

In some embodiments, specific liquid electrolyte solvents that may be favorable towards the anode (e.g., have relatively low reactivity towards lithium, good lithium ion conductivity, and/or relatively low polysulfide solubility) include, but are not limited to 1,1-dimethoxyethane (1,1-DME), 1,1-diethoxyethane, 1,2-diethoxyethane, diethoxymethane, dibutyl ether, anisole or methoxybenzene, veratrole or 1,2-dimethoxybenzene, 1,3-dimethoxybenzene, t-butoxyethoxyethane, 2,5-dimethoxytetrahydrofurane, cyclopentanone ethylene ketal, and combinations thereof. Specific liquid electrolyte solvents that may be favorable towards the cathode (e.g., have relatively high polysulfide solubility, and/or can enable high rate capability and/or high sulfur utilization) include, but are not limited to dimethoxyethane (DME, 1,2-dimethoxyethane) or glyme, diglyme, triglyme, tetraglyme, polyglymes, sulfolane, 1,3-dioxolane (DOL), tetrahydrofuran (THF), acetonitrile, and combinations thereof.

Specific mixtures of solvents include, but are not limited to 1,3-dioxolane and dimethoxyethane, 1,3-dioxolane and diethyleneglycol dimethyl ether, 1,3-dioxolane and triethyleneglycol dimethyl ether, and 1,3-dioxolane and sulfolane. The weight ratio of the two solvents in the mixtures may vary from about 5 to 95 to 95 to 5. In some embodiments, a solvent mixture comprises dioxolanes (e.g., greater than 40% by weight of dioxolanes).

In some cases, aqueous solvents can be used as electrolytes for lithium cells. Aqueous solvents can include water, which can contain other components such as ionic salts. In some embodiments, the electrolyte can include species such as lithium hydroxide, or other species rendering the electrolyte basic, so as to reduce the concentration of hydrogen ions in the electrolyte.

Liquid electrolyte solvents can also be useful as plasticizers for gel polymer electrolytes. Examples of useful gel polymer electrolytes include, but are not limited to, those comprising one or more polymers selected from the group consisting of polyethylene oxides, polypropylene oxides, polyacrylonitriles, polysiloxanes, polyimides, polyphosphazenes, polyethers, sulfonated polyimides, perfluorinated membranes (NAFION resins), polydivinyl polyethylene glycols, polyethylene glycol diacrylates, polyethylene glycol dimethacrylates, derivatives of the foregoing, copolymers of the foregoing, crosslinked and network structures of the foregoing, and blends of the foregoing, and optionally, one or more plasticizers.

Examples of useful solid polymer electrolytes include, but are not limited to, those comprising one or more polymers selected from the group consisting of polyethers, polyethylene oxides, polypropylene oxides, polyimides, polyphosphazenes, polyacrylonitriles, polysiloxanes, derivatives of the foregoing, copolymers of the foregoing, crosslinked and network structures of the foregoing, and blends of the foregoing.

In addition to electrolyte solvents, gelling agents, and polymers as known in the art for forming electrolytes may further comprise one or more ionic electrolyte salts, also as known in the art, to increase the ionic conductivity.

Examples of ionic electrolyte salts for use in the electrolytes described herein include, but are not limited to, LiSCN, LiBr, LiI, LiClO$_4$, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, and LiN(SO$_2$CF$_3$)$_2$. Other electrolyte salts that may be useful include lithium polysulfides (Li2S$_x$), and lithium salts of organic ionic polysulfides (LiS$_x$R)$_n$, where x is an integer from 1 to 20, n is an integer from 1 to 3, and R is an organic group, and those disclosed in U.S. Pat. No. 5,538,812 to Lee et al. A range of concentrations of the ionic lithium salts in the solvent may be used such as from about 0.2 m to about 2.0 m (m is moles/kg of solvent). In some embodiments, a concentration in the range between about 0.5 m to about 1.5 m is used. The addition of ionic lithium salts to the solvent is optional in that upon discharge of Li/S cells the lithium sulfides or polysulfides formed typically provide ionic conductivity to the electrolyte, which may make the addition of ionic lithium salts unnecessary. Furthermore, if an ionic N—O additive such as an inorganic nitrate, organic nitrate, or inorganic nitrite is used, it may provide ionic conductivity to the electrolyte in which case no additional ionic lithium electrolyte salts may be needed.

As noted previously a heterogeneous electrolyte may be used in an electrochemical cell including the currently disclosed electrode structures. As used herein, a "heterogeneous electrolyte" is an electrolyte including at least two different liquid solvents (referred to herein as first and second electrolyte solvents, or anode-side and cathode-side electrolyte solvents). The two different liquid solvents may be miscible or immiscible with one another, although in many aspects, many electrolyte systems include one or more solvents that are immiscible (or can be made immiscible within the cell) to the extent that they will largely separate and at least one can be isolated from at least one component of the cell. A heterogeneous electrolyte may be in the form of a liquid, a gel, or a combination thereof. Specific examples of heterogeneous electrolytes are provided below.

As certain embodiments described herein involve a heterogeneous electrolyte having at least two electrolyte solvents that can partition during operation of the electrochemical cell, one goal may be to prevent or decrease the likelihood of spontaneous solvent mixing, i.e., generation of an emulsion of two immiscible liquids. This may be achieved in some embodiments by "immobilizing" at least one electrolyte solvent at an electrode (e.g., an anode) by forming, for example, a polymer gel electrolyte, glassy-state polymer, or a higher viscosity liquid that resides disproportionately at that electrode.

In one embodiment, suitable electrolytes for the heterogeneous electrolyte include a first electrolyte solvent (e.g., dioxolane (DOL)) that partitions towards the anode and is favorable towards the anode (referred to herein as an "anode-side electrolyte solvent") and a second electrolyte solvent (e.g., 1,2-dimethoxyethane (DME)) that partitions towards the cathode and is favorable towards the cathode (and referred to herein as an "cathode-side electrolyte solvent"). In some embodiments, the anode-side electrolyte solvent has a relatively lower reactivity towards lithium metal and may be less soluble to polysulfides (e.g., Li$_2$S$_x$, where x>2) than the cathode-side electrolyte solvent. The cathode-side electrolyte solvent may have a relatively higher solubility towards polysulfides, but may be more reactive towards lithium metal. By separating the electrolyte solvents during operation of the electrochemical cell such that the anode-side electrolyte solvent is present disproportionately at the anode and the cathode-side electrolyte solvent is present disproportionately at the cathode, the electrochemical cell can benefit from desirable characteristics of both electrolyte solvents (e.g., relatively low lithium reactivity of the anode-side electrolyte solvent and relatively high polysulfide solubility of the cathode-side electrolyte solvent). Specifically, anode consumption can be decreased, buildup of insoluble polysulfides (i.e., "slate", lower-order polysulfides such as Li$_2$S$_x$, where x<3, e.g., Li$_2$S$_2$ and Li$_2$S) at the cathode can be decreased, and as a result, the electrochemical cell may have a longer cycle life. Furthermore, the batteries described herein may have a high specific energy (e.g., greater than 400 Wh/kg), improved safety, and/or may be operable at a wide range of temperatures (e.g., from −70° C. to +75° C.). Disproportionate presence of one species or solvent, verses another, at a particular location in a cell means that the first species or solvent is present, at that location (e.g., at a surface of a cell electrode) in at least a 2:1 molar or weight ratio, or even a 5:1, 10:1, 50:1, or 100:1 or greater ratio.

In some embodiments, electrochemical cells may further comprise a separator interposed between the cathode and anode. The separator may be a solid non-conductive or insulative material which separates or insulates the anode and the cathode from each other preventing short circuiting, and which permits the transport of ions between the anode and the cathode.

The pores of the separator may be partially or substantially filled with electrolyte. Separators may be supplied as porous free standing films which are interleaved with the anodes and the cathodes during the fabrication of cells. Alternatively, the porous separator layer may be applied directly to the surface of one of the electrodes, for example, as described in PCT Publication No. WO 99/33125 to Carlson et al. and in U.S. Pat. No. 5,194,341 to Bagley et al.

A variety of separator materials are known in the art. Examples of suitable solid porous separator materials include, but are not limited to, polyolefins, such as, for example, polyethylenes and polypropylenes, glass fiber filter papers, and ceramic materials. Further examples of separators and separator materials suitable for use in this invention are those comprising a microporous xerogel layer, for example, a microporous pseudo-boehmite layer, which may be provided either as a free standing film or by a direct coating application on one of the electrodes, as described in U.S. patent application Ser. Nos. 08/995,089 and 09/215,112 by Carlson et al. of the common assignee. Solid electrolytes and gel electrolytes may also function as a separator in addition to their electrolyte function.

In some embodiments, the application of a force normal to the electroactive surfaces within the electrochemical cell may reduce and/or prevent depletion of active materials due to undesired side reactions such as mossy lithium growth, dendritic formation, and other applicable side reactions. Correspondingly, the application of a normal force to the electroactive surface may reduce and/or eliminate the need for the inclusion of large amounts of anode active material and/or electrolyte within the electrochemical cell. By reducing and/or eliminating the need to accommodate for active material loss during charge-discharge of the cell, smaller amounts of anode active material may be used to fabricate cells and devices. The force may be applied to the exterior of a cell or to the internal components of a cell using any number of different configurations including, for example, the embodiments described below. Examples of structures that could be used to apply a suitable force are described in more detail in U.S. patent application Ser. No. 12/535,328, filed Aug. 4, 2009, published as U.S. Pub. No. 2010/0035128, and entitled "Application of Force In Electrochemical Cells"; U.S. patent application Ser. No. 12/727,862, filed Mar. 19, 2010, entitled "Cathode for Lithium Battery", which is incorporated herein by reference in its entirety for all purposes.

The following documents are incorporated herein by reference in their entireties for all purposes: U.S. Pat. No. 7,247,408, filed May 23, 2001, entitled "Lithium Anodes for Electrochemical Cells"; U.S. Pat. No. 5,648,187, filed Mar. 19, 1996, entitled "Stabilized Anode for Lithium-Polymer Batteries"; U.S. Pat. No. 5,961,672, filed Jul. 7, 1997, entitled "Stabilized Anode for Lithium-Polymer Batteries"; U.S. Pat. No. 5,919,587, filed May 21, 1997, entitled "Novel Composite Cathodes, Electrochemical Cells Comprising Novel Composite Cathodes, and Processes for Fabricating Same"; U.S. patent application Ser. No. 11/400,781, filed Apr. 6, 2006, published as U.S. Pub. No. 2007-0221265, and entitled "Rechargeable Lithium/Water, Lithium/Air Batteries"; International Patent Apl. Serial No.: PCT/US2008/009158, filed Jul. 29, 2008, published as International Pub. No. WO/2009017726, and entitled "Swelling Inhibition in Lithium Batteries"; U.S. patent application Ser. No. 12/312,764, filed May 26, 2009, published as U.S. Pub. No. 2010-0129699, and entitled "Separation of Electrolytes"; International Patent Apl. Serial No.: PCT/US2008/012042, filed Oct. 23, 2008, published as International Pub. No. WO/2009054987, and entitled "Primer for Battery Electrode"; U.S. patent application Ser. No. 12/069,335, filed Feb. 8, 2008, published as U.S. Pub. No. 2009-0200986, and entitled "Protective Circuit for Energy-Storage Device"; U.S. patent application Ser. No. 11/400,025, filed Apr. 6, 2006, published as U.S. Pub. No. 2007-0224502, and entitled "Electrode Protection in both Aqueous and Non-Aqueous Electrochemical Cells, including Rechargeable Lithium Batteries"; U.S. patent application Ser. No. 11/821,576, filed Jun. 22, 2007, published as U.S. Pub. No. 2008/0318128, and entitled "Lithium Alloy/Sulfur Batteries"; patent application Ser. No. 11/111,262, filed Apr. 20, 2005, published as U.S. Pub. No. 2006-0238203, and entitled "Lithium Sulfur Rechargeable Battery Fuel Gauge Systems and Methods"; U.S. patent application Ser. No. 11/728,197, filed Mar. 23, 2007, published as U.S. Pub. No. 2008-0187663, and entitled "Co-Flash Evaporation of Polymerizable Monomers and Non-Polymerizable Carrier Solvent/Salt Mixtures/Solutions"; International Patent Apl. Serial No.: PCT/US2008/010894, filed Sep. 19, 2008, published as International Pub. No. WO/2009042071, and entitled "Electrolyte Additives for Lithium Batteries and Related Methods"; International Patent Apl. Serial No.: PCT/US2009/000090, filed Jan. 8, 2009, published as International Pub. No. WO/2009/089018, and entitled "Porous Electrodes and Associated Methods"; U.S. patent application Ser. No. 12/535,328, filed Aug. 4, 2009, published as U.S. Pub. No. 2010/0035128, and entitled "Application of Force In Electrochemical Cells"; U.S. patent application Ser. No. 12/727,862, filed Mar. 19, 2010, entitled "Cathode for Lithium Battery"; U.S. patent application Ser. No. 12/471,095, filed May 22, 2009, entitled "Hermetic Sample Holder and Method for Performing Microanalysis Under Controlled Atmosphere Environment"; U.S. patent application Ser. No. 12/862,513, filed on Aug. 24, 2010, entitled "Release System for Electrochemical cells (which claims priority to Provisional Patent Apl. Ser. No. 61/236,322, filed Aug. 24, 2009, entitled "Release System for Electrochemical Cells"); U.S. Provisional Patent Apl. Ser. No. 61/376,554, filed on Aug. 24, 2010, entitled "Electrically Non-Conductive Materials for Electrochemical Cells;" U.S. patent application Ser. No. 12/862,528, filed on Aug. 24, 2010, published as U.S. Pub. No. 2011/0177398, entitled "Electrochemical Cell;" U.S. patent application Ser. No. 12/862,563, filed on Aug. 24, 2010, published as U.S. Pub. No. 2011/0070494, entitled "Electrochemical Cells Comprising Porous Structures Comprising Sulfur"; U.S. patent application Ser. No. 12/862,551, filed on Aug. 24, 2010, published as U.S. Pub. No. 2011/0070491, entitled "Electrochemical Cells Comprising Porous Structures Comprising Sulfur"; U.S. patent application Ser. No. 12/862,576, filed on Aug. 24, 2010, published as U.S. Pub. No. 2011/0059361, entitled "Electrochemical Cells Comprising Porous Structures Comprising Sulfur"; U.S. patent application Ser. No. 12/862,581, filed on Aug. 24, 2010, published as U.S. Pub. No. 2011/0076560, entitled "Electrochemical Cells Comprising Porous Structures Comprising Sulfur"; U.S. patent application Ser. No. 13/240,113, filed on Sep. 22, 2011, published as U.S. Pub. No. 2012/0070746, entitled "Low Electrolyte Electrochemical Cells"; U.S. patent application Ser. No. 13/033,419, filed Feb. 23, 2011, published as U.S. Pub. No. 2011/0206992, entitled "Porous Structures for Energy Storage Devices"; U.S. patent application Ser. No. 13/524,662, filed Jun. 15, 2012, published as U.S. Pub. No. 2013/0017441, entitled "Plating Technique for Electrode"; U.S. patent application Ser. No. 13/766,862, filed Feb. 14, 2013, entitled "Electrode Structure for Electrochemical Cell"; and U.S. patent application Ser. No. 13/644,933, filed Oct. 4, 2012, entitled "Electrode Structure and Method for Making the Same". All other patents and patent applications disclosed herein are also incorporated by reference in their entirety for all purposes.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

Example 1

Lithium Nitride Deposition on Different Substrates

Lithium nitride layers were deposited onto each of: a copper metallized polyethylene terephthalate substrate; 4 µm thick metallic lithium; and a lithium oxide buffer layer with a thickness of less than about 100 nm deposited on top of metallic lithium with a thickness of less than about 2 µm.

Figure 5:
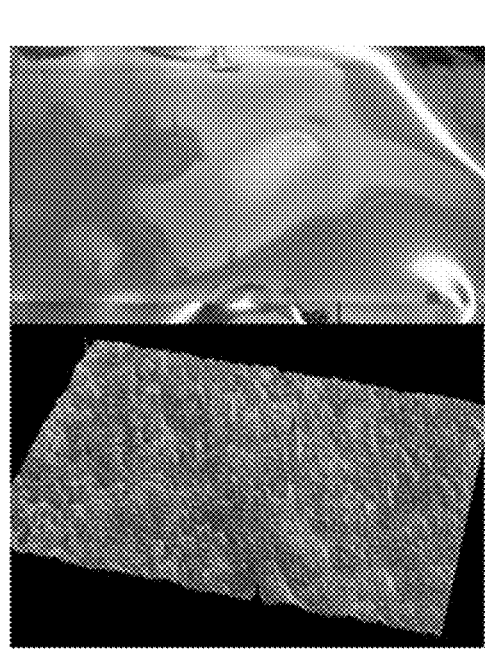
FIG. 5 is a picture and optical profilometry image of lithium nitride deposited onto a copper metallized substrate.
Figure 6:
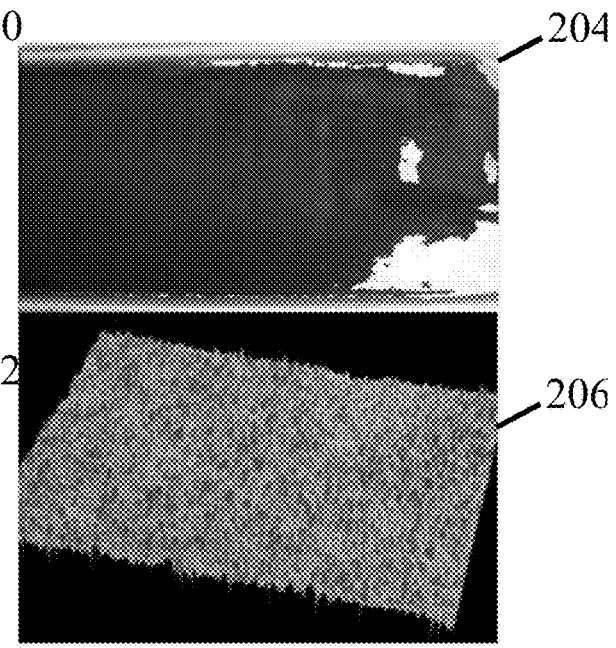
FIG. 6 is a picture and optical profilometry image of lithium nitride deposited onto a lithium metal substrate.
Figure 7:
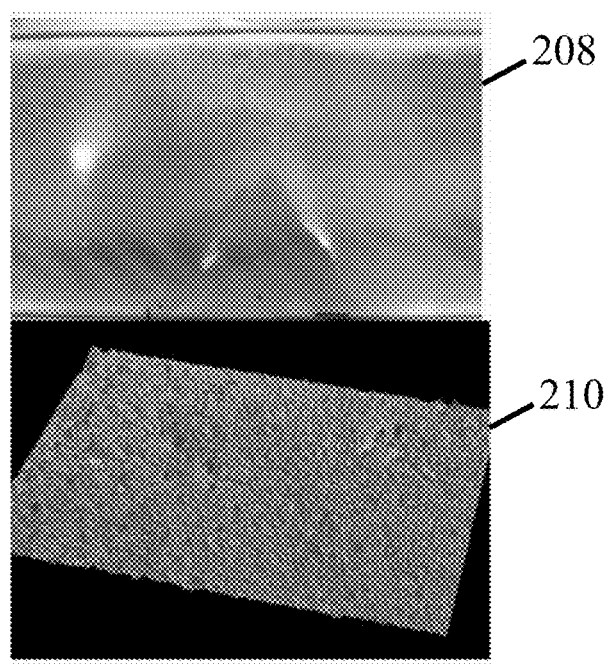
FIG. 7 is a picture and optical profilometry image of lithium nitride deposited onto a lithium oxide buffer layer and underlying lithium metal substrate.

Deposition of the lithium nitride and lithium oxide layers was performed using reaction of lithium vapor and plasma activated nitrogen gas. An image 200 and three dimensional profilometry image 202 of the lithium nitride layer deposited onto the copper metallized substrate is depicted in FIG. 5. An image 204 and three dimensional profilometry image 206 of the lithium nitride layer deposited directly onto metallic lithium is depicted in FIG. 6. An image 208 and three dimensional profilometry image 210 of the lithium nitride layer deposited on top of the lithium oxide buffer layer is depicted in FIG. 7.

The lithium nitride layer deposited on the plain metalized substrate formed a substantially continuous and amorphous lithium nitride layer with an arithmetic mean surface roughness (Ra) of about 40 nm, see FIG. 5. In contrast, deposition of the lithium nitride directly onto the untreated metallic lithium led to total conversion of the underlying metallic lithium into polycrystalline porous lithium nitride with an arithmetic mean surface roughness (Ra) of about 400 nm, see FIG. 6. After coating the metallic lithium with a minimum layer of lithium oxide (e.g., a buffer layer), the deposited lithium nitride layer resulted in a less polycrystalline, smoother material with an Ra of about 100 nm, as well as a thickness close to the targeted 200 nm thickness, see FIG. 7.

Figure 8:
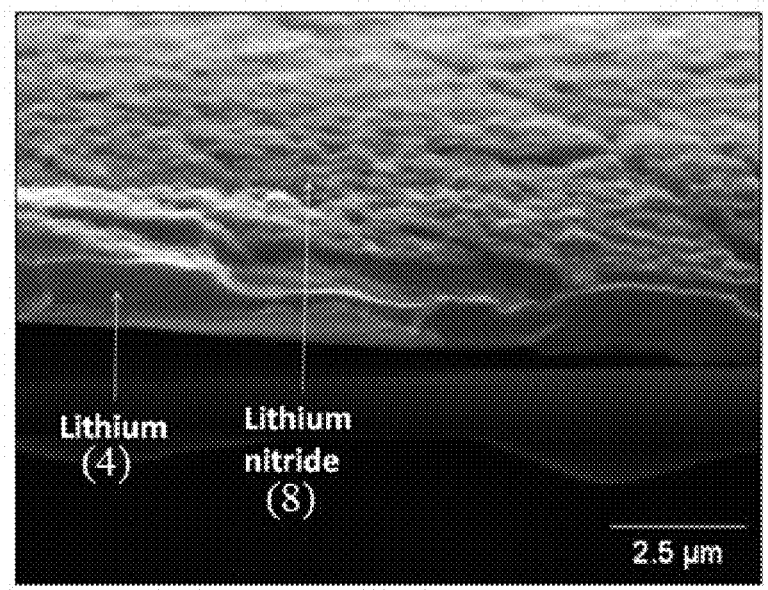
FIG. 8 is a scanning electron microscope image of lithium nitride deposited onto a lithium oxide buffer layer and an underlying lithium metal substrate.

An SEM image of the lithium nitride layer deposited on top of the lithium oxide buffer layer is shown in FIG. 8. The figure clearly shows the unreacted lithium 4 located underneath the deposited lithium nitride layer 8. The lithium oxide buffer layer was too thin to image in the depicted figure.

Example 2

Electrode Structure with an Increased Lithium Oxide Thickness

Figure 9:
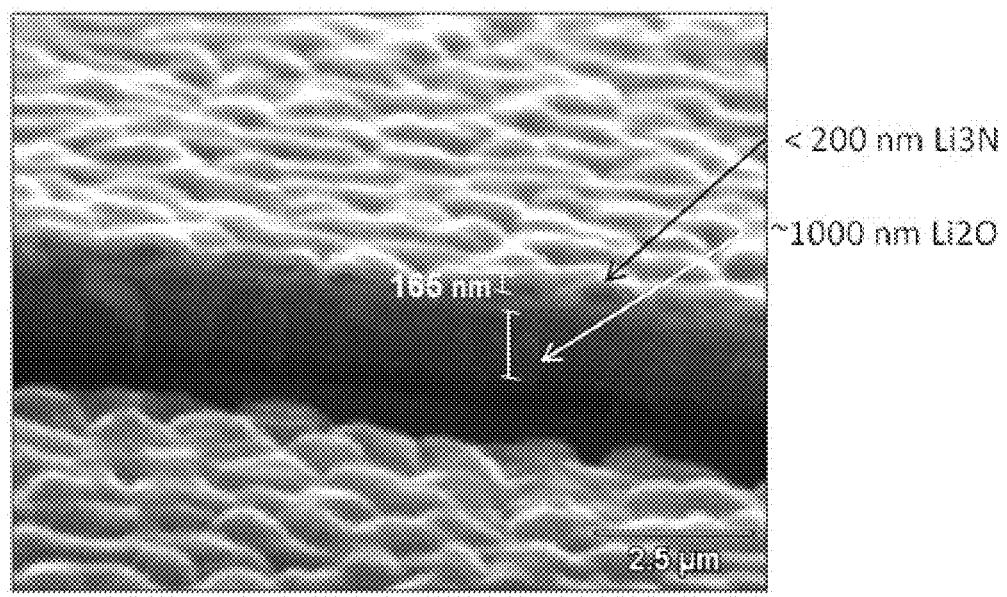
FIG. 9 is a scanning electron microscope image of lithium nitride deposited onto a lithium oxide buffer layer and an underlying lithium metal substrate.

Since the thickness of the lithium oxide buffer layer in the electrode structure of the previous example was too thin to be measured, a further experiment was performed to show that it is the presence and benefit of the buffer layer between the lithium metal layer and lithium nitride layer that prevented conversion of the underlying lithium metal layer. A lithium oxide layer with a thickness of about 1 µm, which is easily measurable by regular techniques (SEM cross section imaging), was coated on a 25 µm thick metallic lithium substrate. A 200 nm coating of lithium nitride was then deposited on top of the lithium oxide layer. As illustrated by FIG. 9, the lithium oxide layer is visible and separates the unreacted metallic lithium substrate from the layer of lithium nitride. Further, the lithium nitride layer had a thickness of close to the targeted 200 nm thickness.

Example 3

Impedance Spectroscopy

Figure 10:
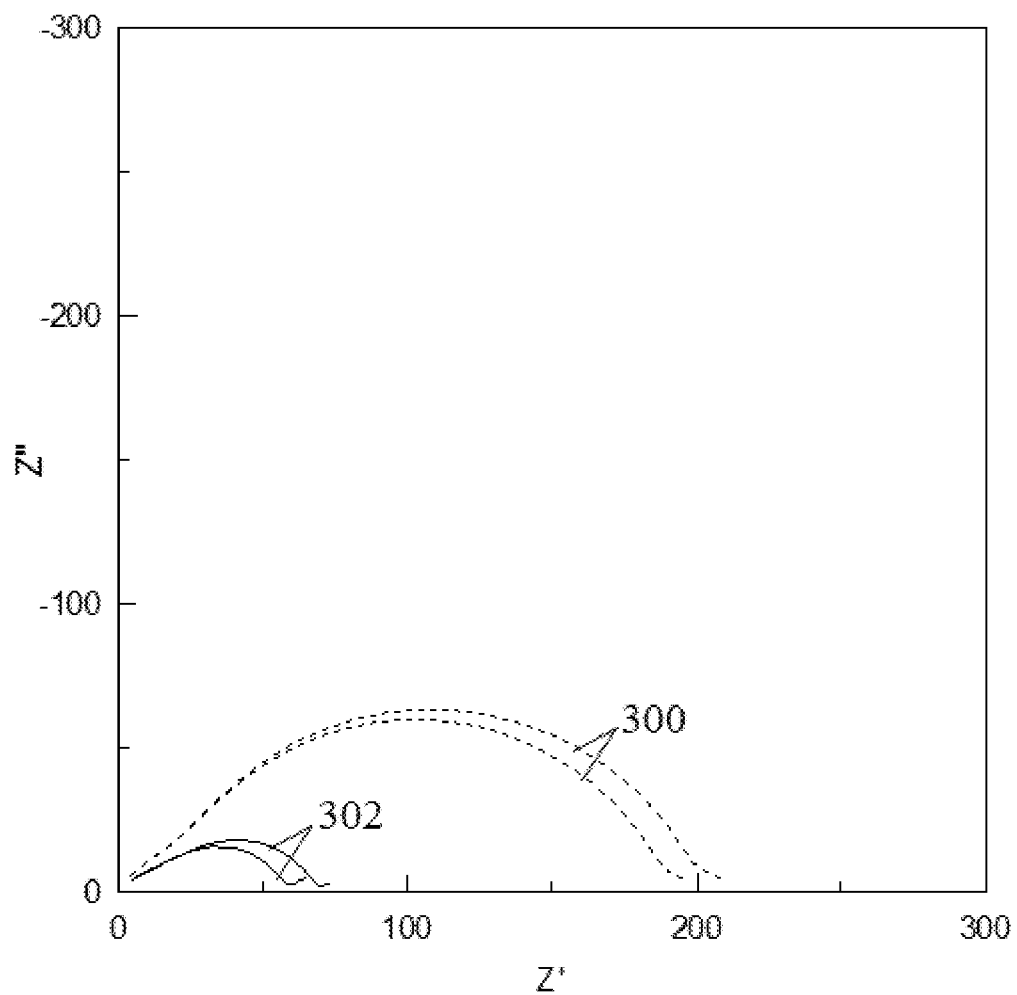
FIG. 10 is a graph of impedance spectra for electrodes having lithium oxide layers and lithium nitride layers deposited on lithium oxide buffer layers.

Small flat symmetric lithium-lithium cells were constructed from electrodes including a 200 nm lithium nitride layer on top of a 1 micron buffer oxide layer and 25 microns of lithium metal. Similar cells were constructed using the same materials without the lithium nitride coating (i.e. 1 micron oxide buffer layer on top of 25 microns of lithium metal). The cells were then subjected to impedance spectroscopy testing. FIG. 10 presents the impedance spectroscopy results for the cells only including electrodes with an outer layer of lithium oxide deposited on the metallic lithium, lines 300, and the cells including electrodes with an outer layer of lithium nitride deposited onto the lithium oxide buffer layers and metallic lithium, lines 302. As illustrated by the figure, the electrode structures incorporating both the lithium nitride and lithium oxide material layers had less than about one third of the impedance of the electrode structure including only the lithium oxide. Without wishing to be bound by theory, the lithium nitride coated onto the lithium oxide layer lowers the charge transfer resistance of the resulting electrode structure, which provides the observed decrease in the cell impedance.

Example 4

Buffer Layer Formation Using Plasma Treatment

This example illustrates the results of forming a buffer layer using a plasma treatment to convert a surface layer of an underlying metallic lithium substrate. The noted plasma treatment can be conducted using an appropriate passivating gas including, for example, $N_2O$ or $CO_2$. In comparison to the deposition processes noted above, the plasma treatment was expected to result in a relatively thin oxide layer due to the plasma treatment only converting a surface layer of the metallic lithium. As expected, the plasma treatment of the metallic lithium surface converted part of the lithium on the surface into lithium oxide. However, the lithium oxide layer that was formed on the underlying metallic lithium was very thin, porous, and discontinuous. It was noted that this porous and discontinuous lithium oxide layer was unsuitable for use as a buffer layer since the porous and discontinuous nature of the layer would permit a subsequently deposited material to interact with the underlying metallic lithium possibly leading to subsequent conversion of the metallic lithium.

What is claimed is:

1. An electrode structure comprising:
   a metallic lithium layer;
   a substantially continuous and substantially nonporous buffer layer disposed directly on the metallic lithium layer, wherein the buffer layer is a ceramic layer, a glassy-ceramic layer, or a glass layer and is conductive to lithium ions, wherein the buffer layer comprises carbon, wherein lithium makes up between 45 mol % and 65 mol % of the buffer layer, wherein nitrogen makes up between 0 mol % and 5 mol % of the buffer layer, wherein oxygen makes up between 25 mol % and 40 mol % of the buffer layer, and for which a molar ratio of lithium to carbon is greater than or equal to 1.75:1; and
   a substantially continuous and substantially nonporous lithium nitride layer disposed directly on the buffer layer.

2. An electrode structure comprising:
   an electroactive material layer comprising an electroactive species, wherein the electroactive species comprises metallic lithium;
   a substantially continuous and substantially nonporous buffer layer disposed directly on the electroactive material layer, wherein the buffer layer is a ceramic layer, a glassy-ceramic layer, or a glass layer and is conductive to ions of the electroactive species, wherein the buffer layer comprises carbon, wherein lithium makes up between 45 mol % and 65 mol % of the buffer layer, wherein nitrogen makes up between 0 mol % and 5 mol % of the buffer layer, wherein oxygen makes up between 25 mol % and 40 mol % of the buffer layer, and for which a molar ratio of lithium to carbon is greater than or equal to 1.75:1; and a substantially continuous and substantially nonporous protective layer disposed directly on the buffer layer, wherein the protective layer is formed using a gas, a plasma, a material, or a fluid that is reactive with the electroactive material layer.

3. A method for forming an electrode structure, the method comprising:

providing a metallic lithium layer;

after providing the metallic lithium layer, depositing a substantially continuous and substantially nonporous buffer layer directly onto the metallic lithium layer, wherein the buffer layer is a ceramic layer, a glassy-ceramic layer, or a glass layer and is conductive to lithium ions, wherein the buffer layer comprises carbon, wherein lithium makes up between 45 mol % and 54 mol % of the buffer layer, wherein nitrogen makes up between 0 mol % and 5 mol % of the buffer layer, wherein oxygen makes up between 25 mol % and 40 mol % of the buffer layer, and for which a molar ratio of lithium to carbon is greater than or equal to 1.75:1; and after depositing the substantially continuous and substantially nonporous buffer layer directly onto the metallic lithium layer, depositing a substantially continuous and substantially nonporous lithium nitride layer directly onto the buffer layer.

4. The electrode structure of claim 1, wherein the buffer layer is the ceramic layer.

5. The electrode structure of claim 1, wherein the buffer layer comprises at least one of lithium oxide, lithium phosphorus oxynitride, lithium oxynitride, lithium carbonate, a lithium halide, lithium iodide, and lithium bromide.

6. The electrode structure of claim 1, wherein the buffer layer comprises nitrogen.

7. The electrode structure of claim 1, wherein the buffer layer is substantially amorphous.

8. The electrode structure of claim 1, wherein the buffer layer is polycrystalline.

9. The electrode structure of claim 2, wherein the protective layer comprises at least one of lithium nitride, lithium silicate, lithium borate, lithium aluminate, lithium phosphate, lithium silicosulfide, lithium germanosulfide, a lithium lanthanum oxide, a lithium titanium oxide, lithium borosulfide, lithium aluminosulfide, lithium phosphosulfide.

10. The electrode structure of claim 1, wherein the buffer layer is nonstoichiometric.

11. The electrode structure of claim 1, wherein the buffer layer has a molar ratio of lithium to carbon that is less than or equal to 2:1.

12. The electrode structure of claim 1, wherein the lithium nitride layer is substantially amorphous.

13. The electrode structure of claim 1, wherein a thickness of the buffer layer is between 200 nm and 1 μm.

14. The electrode structure of claim 1, wherein a thickness of the lithium nitride layer is between 2 and 10 times a thickness of the buffer layer.

15. The electrode structure of claim 1, wherein a charge transfer resistance across the lithium nitride layer and buffer layer is less than the charge transfer resistance across the buffer layer without the lithium nitride layer.

16. The electrode structure of claim 1, wherein the lithium nitride layer has an arithmetic mean surface roughness of less than or equal to 150 nm.

17. The electrode structure of claim 1, wherein an arithmetic mean surface roughness (Ra) of the lithium nitride layer is between 50 nm and 150 nm.

18. The electrode structure of claim 9, further comprising a release layer disposed on a surface of at least one of the electroactive material layer and the protective layer.

19. The electrode structure of claim 18, further comprising a carrier substrate disposed on the release layer.

20. The electrode structure of claim 1, wherein the lithium nitride layer is a single, ceramic layer.

21. The electrode structure of claim 1, wherein the electrode structure consists essentially of the metallic lithium layer, the buffer layer, and the lithium nitride layer.

22. The electrode structure of claim 1, wherein the electrode structure comprises a protective structure including no more than two layers, and wherein the two layers are the buffer layer and the lithium nitride layer.

23. An electrochemical cell comprising the electrode structure of claim 22, wherein the electrochemical cell further comprises an electrolyte.

24. The electrode structure of claim 1, wherein the buffer layer comprises lithium oxide.

25. The electrode structure of claim 1, wherein the buffer layer comprises a dopant, and wherein the lithium nitride layer comprises a dopant.

26. The electrode structure of claim 1, wherein lithium makes up between 10 wt % and 50 wt % of the buffer layer, wherein nitrogen makes up between 0 wt % and 50 wt % of the buffer layer, and wherein oxygen makes up between 50 wt % and 70 wt % of the buffer layer.

27. The electrode structure of claim 1, wherein the buffer layer comprises a glass formed from lithium carbonate and lithium oxide.

28. The electrode structure of claim 1, wherein the buffer layer has a lithium ion conductivity of greater than or equal to $10^{-5}$ S/cm.

29. The electrode structure of claim 1, wherein the buffer layer has a lithium ion conductivity of less than or equal to $10^{-4}$ S/cm.

* * * * *